(12) United States Patent
Voysey

(10) Patent No.: US 8,958,918 B2
(45) Date of Patent: Feb. 17, 2015

(54) BUILDING OPTIMIZATION SYSTEM AND LIGHTING SWITCH WITH ADAPTIVE BLIND, WINDOW AND AIR QUALITY CONTROLS

(75) Inventor: Keith Voysey, Yorba Linda, CA (US)

(73) Assignee: Genea Energy Partners, Inc., Irvine, CA (US)

( * ) Notice: Subject to any disclaimer, the term of this patent is extended or adjusted under 35 U.S.C. 154(b) by 0 days.

(21) Appl. No.: 13/481,744

(22) Filed: May 25, 2012

(65) Prior Publication Data

US 2012/0239202 A1    Sep. 20, 2012

Related U.S. Application Data

(63) Continuation of application No. 12/417,593, filed on Apr. 2, 2009, now Pat. No. 8,190,301, which is a continuation-in-part of application No. 12/033,831, filed on Feb. 19, 2008, now abandoned.

(60) Provisional application No. 61/041,874, filed on Apr. 2, 2008.

(51) Int. Cl.
    *G06F 19/00*    (2011.01)
    *H05B 37/02*    (2006.01)

(52) U.S. Cl.
    CPC ........ *H05B 37/0218* (2013.01); *H05B 37/0272* (2013.01); *Y02B 20/46* (2013.01)
    USPC ........................... 700/275; 700/291; 340/2.24

(58) Field of Classification Search
    USPC .......... 700/275, 291; 315/159; 340/2.24, 567, 340/635; 362/249.02
    See application file for complete search history.

(56) References Cited

U.S. PATENT DOCUMENTS 4,539,625 A    9/1985   Bornstein et al.
5,293,097 A    3/1994   Elwell
            (Continued)

FOREIGN PATENT DOCUMENTS

CN    1327707 A    12/2001
EP    1204300 A1    5/2002
            (Continued)

OTHER PUBLICATIONS

FS-T1 Solar Sensor; Nov. 1998; Siemans Building Technologies; pp. 1-2.
            (Continued)

*Primary Examiner* — Kidest Bahta
(74) *Attorney, Agent, or Firm* — Mintz Levin Cohn Ferris Glovsky and Popeo, P.C.

(57) ABSTRACT

A building optimization system for optimizing an environment of a building is disclosed. The building optimization system includes a number of building optimization switches for controlling the environment of a corresponding space in a building according to a plurality of operation modes, as well as any number of modular, interchangeable binary controllers for controlling various environmental factors of a number of zones of a building. The building optimization includes switch an A/B lighting switch having lighting controls and a graphical display. The A/B lighting switch is further connected to one or more sensors for sensing and measuring environmental data of at least one zone of the building. The building optimization switch further includes a binary controller connected with the A/B lighting switch to control an environmental variable of the zone based on user input or the environmental data.

13 Claims, 30 Drawing Sheets

(56) References Cited

U.S. PATENT DOCUMENTS

| | | |
|---|---|---|
| 5,565,855 A | 10/1996 | Knibbe |
| 5,764,146 A | 6/1998 | Baldwin et al. |
| 6,029,092 A | 2/2000 | Stein |
| 6,993,417 B2 | 1/2006 | Osann, Jr. |
| 7,253,732 B2 | 8/2007 | Osann, Jr. |
| 7,738,870 B2 | 6/2010 | Howard |
| 8,190,301 B2 | 5/2012 | Voysey |
| 2005/0043907 A1 | 2/2005 | Eckel et al. |
| 2005/0102040 A1 | 5/2005 | Kruse et al. |
| 2006/0044152 A1 | 3/2006 | Wang |
| 2006/0125649 A1 | 6/2006 | Ostrovsky et al. |
| 2008/0180553 A1 | 7/2008 | Hassan-Shafique et al. |

FOREIGN PATENT DOCUMENTS

| | | |
|---|---|---|
| JP | 63-503255 A | 11/1988 |
| JP | 2000010621 A | 1/2000 |
| JP | 2002245102 A | 8/2002 |
| JP | 2004-178938 A2 | 6/2004 |
| JP | 2004259565 A | 9/2004 |
| JP | 2005215789 A | 8/2005 |
| JP | 2005-234763 A2 | 9/2005 |
| JP | 2005-538506 A | 12/2005 |
| JP | 2006-278060 A2 | 10/2006 |
| JP | 2007035420 A | 2/2007 |
| JP | 2007519185 A | 7/2007 |
| WO | WO-87/05744 A1 | 9/1987 |
| WO | WO-99/60538 A1 | 11/1999 |
| WO | WO-00/46657 A3 | 12/2000 |
| WO | WO 01/11926 A1 | 2/2001 |
| WO | WO-2004/023849 A1 | 3/2004 |
| WO | WO-03077610 A8 | 3/2005 |
| WO | WO-2005041146 A1 | 5/2005 |
| WO | WO-2005069698 A1 | 7/2005 |
| WO | WO-2006033062 A1 | 3/2006 |

OTHER PUBLICATIONS

International Search Report and Written Opinion dated Aug. 10, 2009, for PCT application No. PCT/US2009/039364.

International Search Report and Written Opinion dated May 29, 2008, for PCT application No. PCT/US2008/002224.

SAF 25 Sun Compesator-Solar Sensor; 2001; Honeywell and Building Control; pp. 1-2.

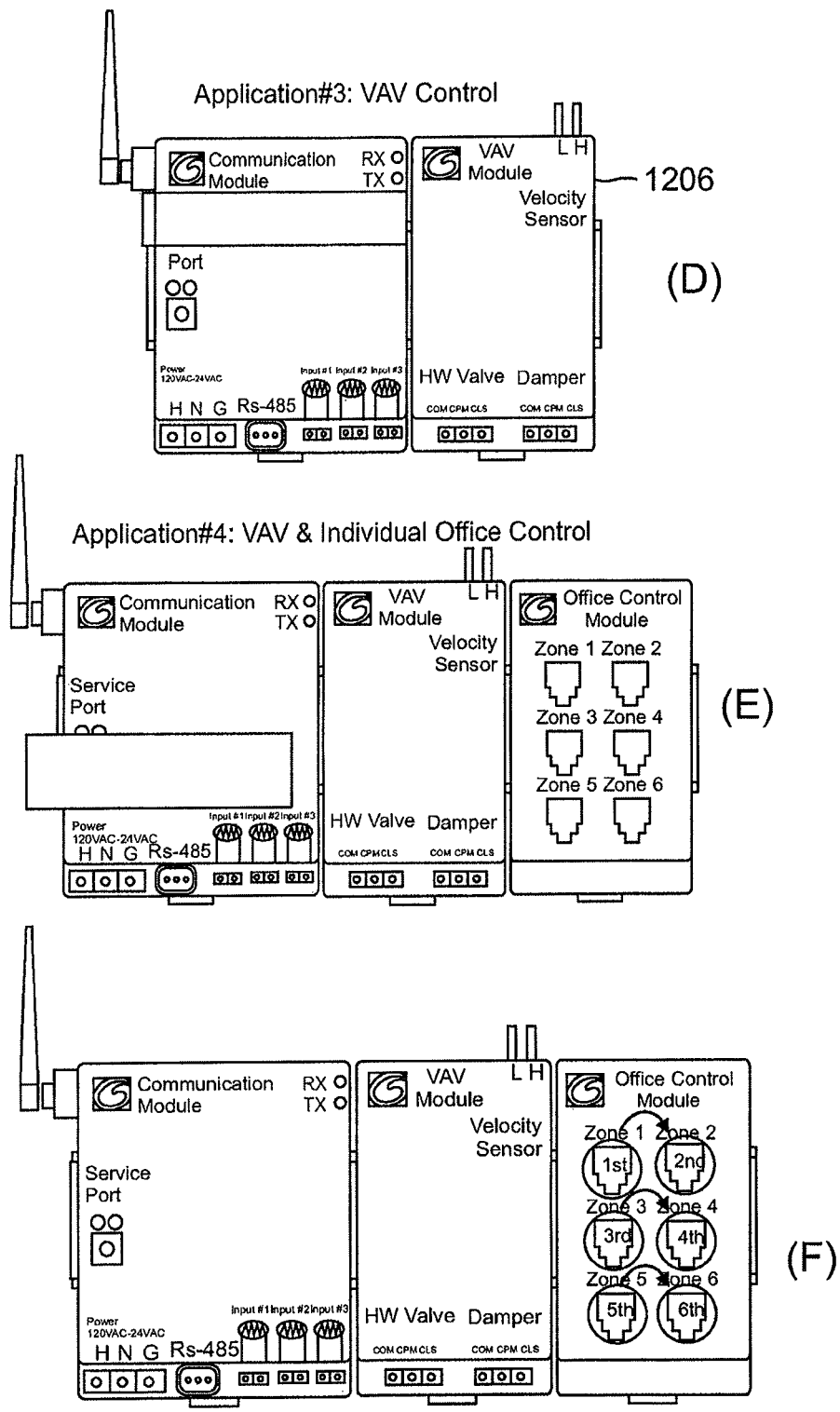
FIG. 12 (contd.)

BUILDING OPTIMIZATION SYSTEM AND LIGHTING SWITCH WITH ADAPTIVE BLIND, WINDOW AND AIR QUALITY CONTROLS

CROSS REFERENCE TO RELATED APPLICATIONS

This application is a continuation of and claims the benefit of priority under 35 U.S.C. §120 of U.S. patent application Ser. No. 12/417,593, filed on Apr. 2, 2009, entitled "Building Optimization System And Lighting Switch With Adaptive Blind, Window And Air Quality Controls" (now issued as U.S. Pat. No. 8,190,301) which claims the benefit of priority under 35 U.S.C. §119 to U.S. Provisional Patent Application No. 61/041,874, filed on Apr. 2, 2008, and entitled, "Building Optimization System". This application is also a continuation-in-part of and claims the benefit of priority under 35 U.S.C. §120 of U.S. patent application Ser. No. 12/033,831, filed on Feb. 19, 2008, and entitled, "Building Optimization System and Lighting Switch." The entire disclosures of all of these references are incorporated by reference herein.

BACKGROUND

This disclosure relates to lighting control switches, and more particularly to a network-capable, AB lighting switch and control module.

Rising energy costs, increasingly tenuous energy supply, and accelerating environmental damage due to present energy production and consumption patterns, are just some factors that can be addressed by a needed new way to operate lighting in a building, without inconveniencing the building's occupants.

SUMMARY

This document discloses a building optimization system, and in particular a building optimization switch, for minimizing the use of electric lighting in a building and thereby optimizing a building's energy use.

The building optimization system includes a number of building optimization switches for controlling the environment of a corresponding space in a building according to a plurality of operation modes, as well as any number of modular, interchangeable binary controllers for controlling various environmental factors of a number of zones of a building. The building optimization includes switch an A/B lighting switch having lighting controls and a graphical display. The A/B lighting switch is further connected to one or more sensors for sensing and measuring environmental data of at least one zone of the building. The building optimization switch further includes a binary controller connected with the A/B lighting switch to control an environmental variable of the zone based on user input or the environmental data.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a building optimization system utilizing a building optimization switch. The building optimization switch provides part of an energy savings control appliance that responds to multiple environmental and/or schedule-based conditions, including, but not limited to: 1) direct, manual override enablement of either or both of the A or B controls; 2) time of day and day of week schedule(s), which reside in a master controller; 3) occupancy state of the controlled environment as initiated by a motion sensor (the motion sensor may be incorporated with the switch, or may be wired in tandem with existing external motion detection occupancy sensor); 4) programmed peak demand requirements as mandated by utility provider schedule and power demand requirements, with programming and scheduling preferably residing with the master controller; and 5) based upon the measured ambient, direct or indirect light available (via roof sensors) the master controller determines the required light for those zones affected by ambient, direct or indirect light, and sends commands to the building optimization switch to turn lighting off accordingly.

Figure 1:
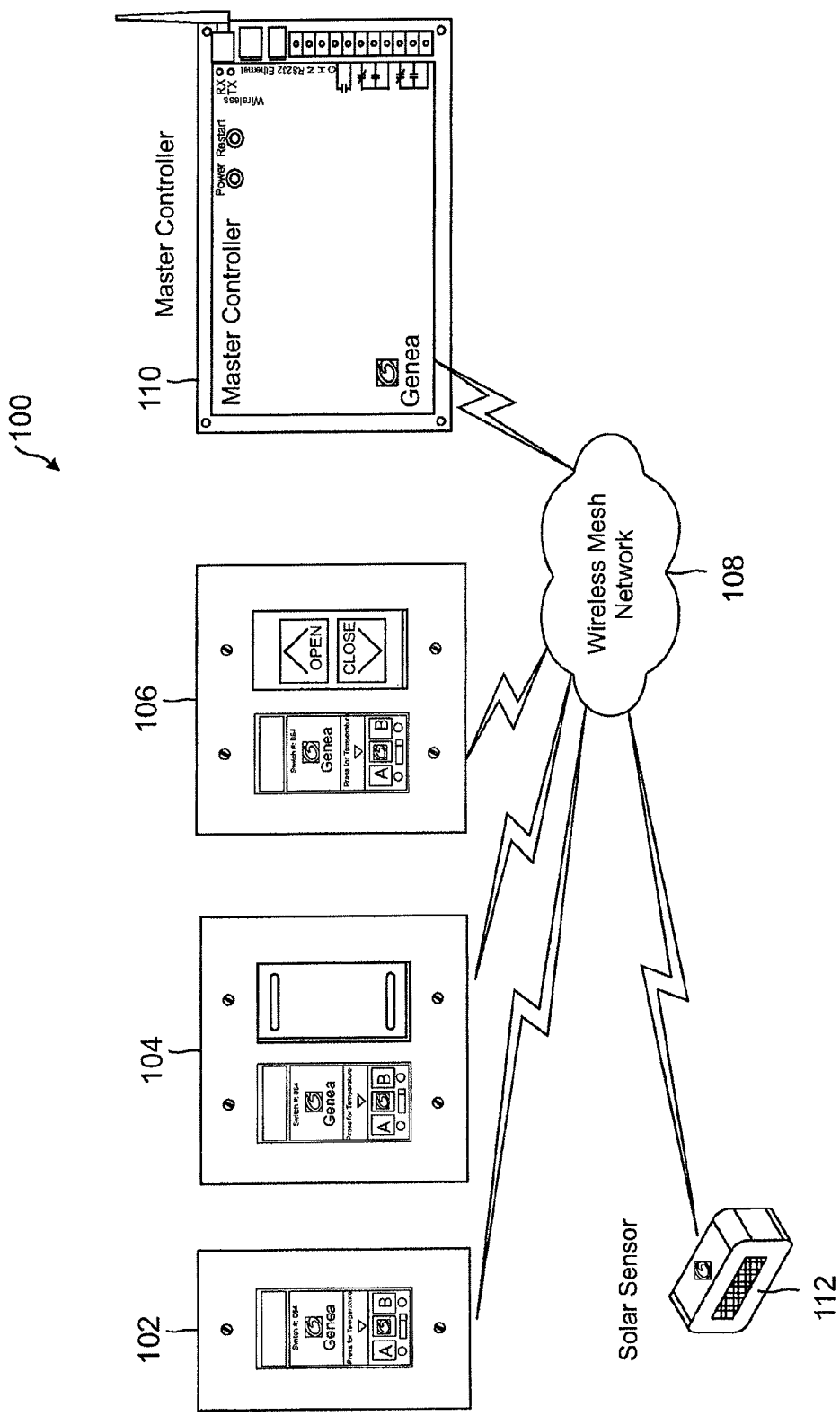
FIG. 1 is a high level depiction of a building optimization system for optimizing energy usage and an environment of a building.

FIG. 1 is a high level depiction of a building optimization system (BOS) 100 for optimizing the energy usage of a building. The (BOS) 100 can include, without limitation and in various numbers and combinations, a building optimization (BO) switch 102, a BO switch with a sensor 104, and/or a BO switch with a blind controller 106, connected by a wireless communications network 108 to a master controller 110. The BO switch 102 is network-capable, and acts as a terminal for enabling a string of functional modules and options, such as temperature control, moisture control, and other options. The wireless communication network 108 operates using any wireless communication protocols, such as IEEE 802.15.4 or the ZigBee specification of low power digital radio communications. The BOS 100 can further include, without limitation and in various numbers and combinations, one or more solar sensors 112 for sensing solar light levels around the building. Each of these components of the BOS 100 will be described in greater detail below.

Each BO switch 102 can be contained at least partly in a physical interface made of a resilient material such as plastic, aluminum, stainless steel, or other material, and which can be mounted to the wall or other structure. The BO switch 102 also includes a power source, which is preferably derived from either direct building wiring circuitry or internal battery, and will typically be predicated on existing building wiring. The BO switch 102 is used to control the amount of electrical lighting used in a space or zone, such as an office or group of offices. Accordingly, the BO switch 102 can turn off either one, or both, lighting banks under its control, depending on such factors as user preferences, or automatically based on ambient light from harvested light. Harvested light is light that is generated by sunlight, reflected light or some other indirect, ambient lighting source, and available for use within a space or zone of a building. Each space or zone is monitored by a A/B lighting control system and controlled to allow harvested light to be adequate or even maximized, to reduce the electrical lighting requirements of the space or zone being monitored.

Figure 2:
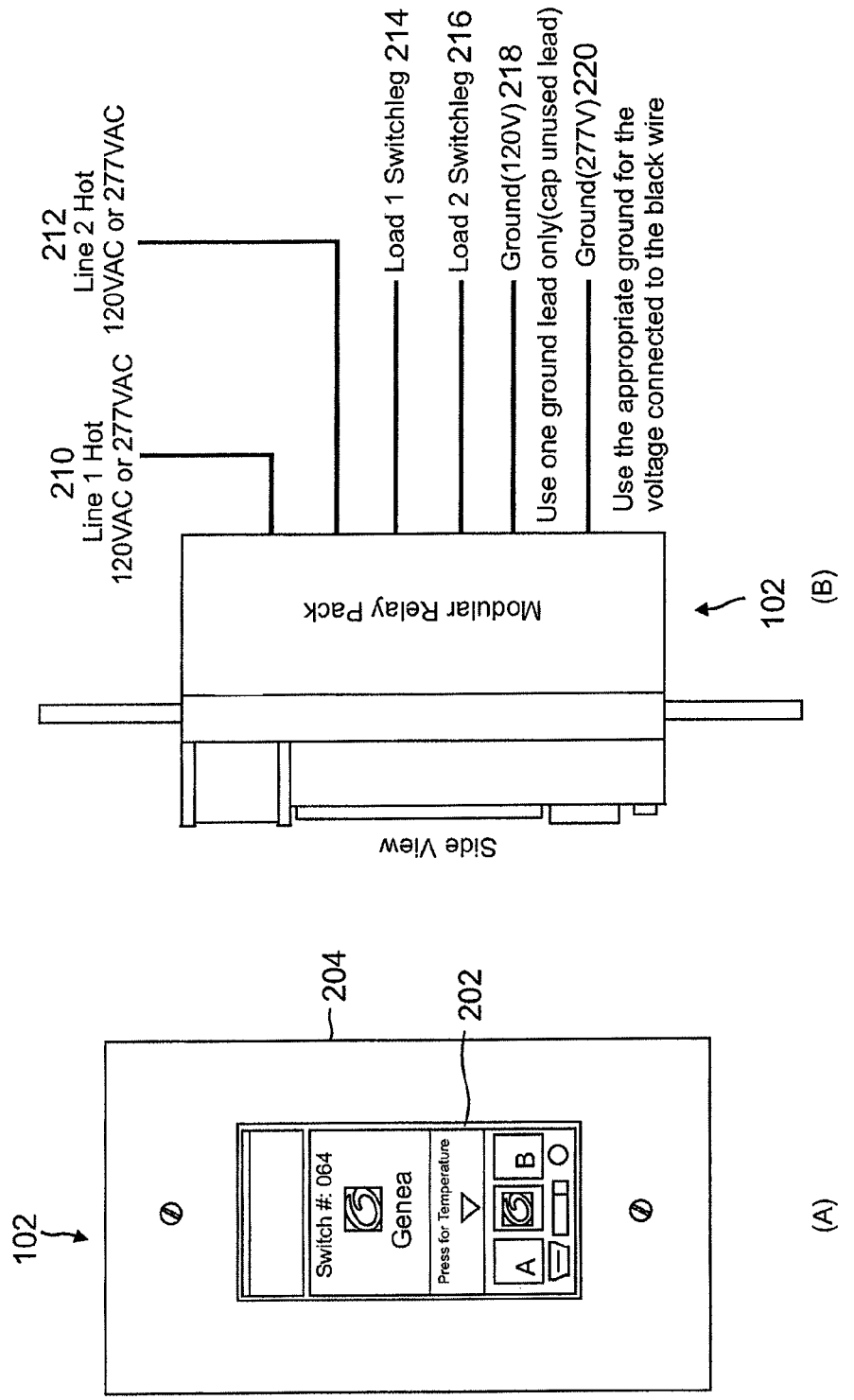
FIG. 2 is a front view of a building optimization switch.

FIG. 2A is a front view of a BO switch 102 that includes an A/B lighting switch 202 and cover plate 204. FIG. 2A is a side view of the A/B lighting switch 202 that can be installed in a wall or other surface of an office or other area of a building. The A/B lighting switch utilizes standard light switch electrical power, and as such includes a line 1 hot wire 210, line 2 hot wire 212, load 1 switchleg wire 214, load 2 switchleg wire 216, a 120V ground wire 218, and a 277V ground wire 220. These wires are preferably connected to the back of the A/B lighting switch 202 via a modular relay pack 222. FIGS. 11A-F illustrate various alternative wiring diagrams.

Figure 3:
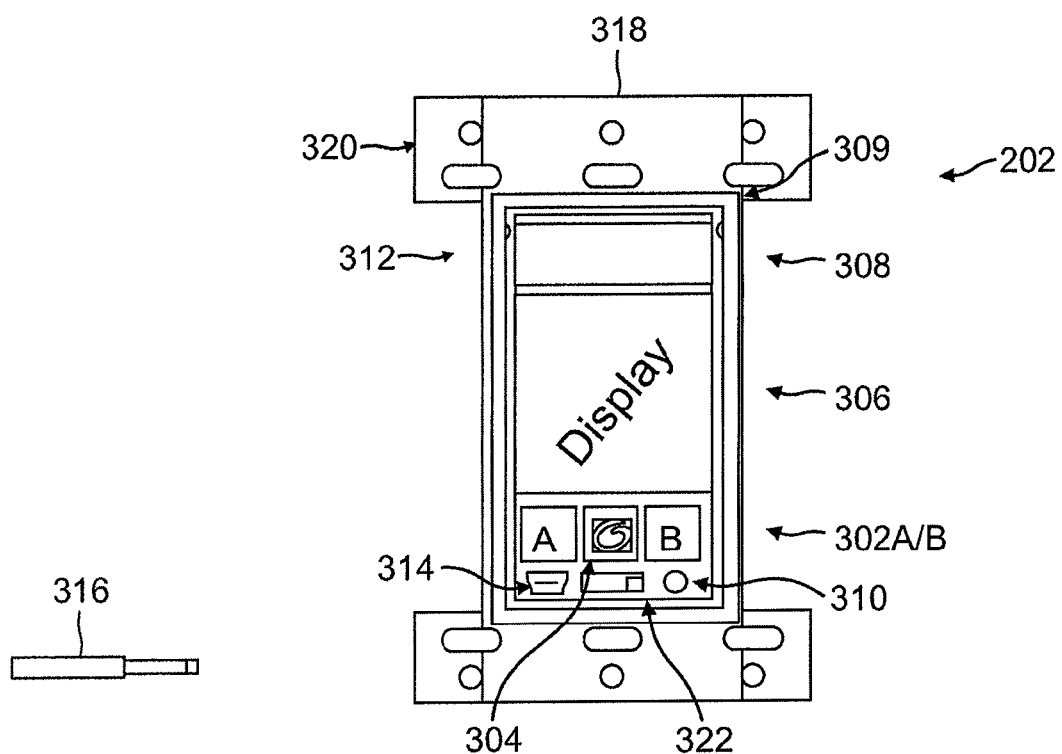
FIG. 3 illustrates a layout of an A/B lighting switch.

FIG. 3 depicts and illustrates a layout of an A/B lighting switch 202, that is adapted for being powered by conventional lighting power, and which includes a wireless transceiver (not shown) for transmission of environmental information of an office or area, such as lighting levels, temperature, occupancy, etc., to the master controller, and for receipt of control signals from the master controller to control various environmental aspects of the office or area, such as lighting, temperature, window blinds, etc. The wireless transceiver is adapted to communicate wirelessly with the master controller or various other components.

The A/B lighting switch 202 refers not only to a light switch capability, but also an interactive computer and display for controlling lighting, receiving environmental data of a zone or set of zones from a number of sensors or sources, and for processing the environmental data to automatically control or assist the control of lighting, HVAC, windows, blinds, dampers, or other systems. The A/B lighting switch 202 also includes communications capabilities, either through a wired or wireless interface, and further includes inputs, outputs and/or access ports for connecting or communicating with any number of other controllers, input devices such as key fobs, remote controls, or other devices such as wireless handset devices, etc. The A/B lighting switch 202, then, functions as a hub on its own, in a building optimization system and network for optimizing the energy and environment of a building, down to the zone level.

The A/B lighting switch 202 includes A and B lighting controls 302A and 302B, respectively. Each control controls a corresponding bank of lights within an office, area or zone in a building. In most conventional commercial buildings, the office, area or zone will include only two independent and separate banks of lights, but more than two banks of lights can be used. Accordingly, the A/B lighting switch 202 may include more lighting controls than just the A and B lighting control buttons, labeled as such herein for simplicity and clarity. The lighting controls 302A and 302B are preferably spring-activated buttons, or touch sensitive regions on the A/B lighting switch 202, and can be backlit with a light of a particular color or set of colors that are dependent on a state of the lighting bank. For example, each lighting control 302A and/or 302B can be backlit with a green light to indicate an "on" state of the corresponding lighting bank, and backlit with a white light, or not lit at all, to indicate an "off" state of the corresponding light bank. Those having skill in the art would recognize that any color or type of light can be used to indicate such states, and that any lighting source may be used, such as light emitting diodes (LEDs), incandescent lights, or other lights.

The A/B lighting switch 202 further includes a mode control 304, preferably proximate the lighting control 302A and 302B as depicted in FIG. 3. The mode control 304 can be used by a user to control certain modes or states of a lighting, temperature, moisture, or other building optimization control system, as will be described in further detail below. The mode control 304 can also be backlit with different color lights to indicate different modes. The mode control 304 as well as lighting controls 302A and 302B, can be used in conjunction with commands or options displayed in a screen 306. The screen 306 is preferably a color display, such as a liquid crystal display (LCD) used in handheld communication devices such as cell phones. The screen 306 displays the commands or user options in a first region, preferably near and corresponding to the lighting controls 302A/B and the mode control 304. The screen 306 can also display control and status information in the form of text and/or graphics, and can also prominently display different background colors to indicate different modes as selected at least in part by mode control 304. Such modes are described in greater detail below.

The A/B lighting switch 202 further includes a motion detector and/or light sensor 308 for detecting the presence of an occupant of an office or area. The motion detector component of the sensor 308 senses for occupancy of the office or area, and reports the occupancy information in a wireless data transmission. The motion detector component of the sensor 308 can be connected to automatically control the lighting banks directly depending on the occupancy information, or such control can be executed by the master controller as described in greater detail below. The light sensor component of the sensor 308 senses and determines a level of lighting within the office or area, which lighting can be from solar light (i.e. outside light from the position and angle of the sun relative to the office or area), ambient light in the office or area, or from the controlled lighting in the office or area. A gasket 309 and associated screws or other attachment mechanisms allows the front panel to be removed, so that physical wires do not have to be detached in order to have service work performed on the A/B lighting switch 202.

As will be discussed below, the light sensor component determines and reports lighting level information in a wireless data transmission, for use by the master controller to automatically control the operation of the A and/or B lighting banks in response to such modes as peak demand, energy savings, or solar light level. The light sensor component may also control the lighting banks directly, i.e. for high solar lighting levels, turning off the B and/or A lights automatically until the solar level decreases to a setpoint level.

In some implementations, the A/B lighting switch 202 further includes a temperature sensor 310 to sense temperature data and report temperature information to the master controller in a wireless data transmission. The sensed temperature can be displayed on screen 306 to assist a user to control the temperature in the office or area. The master controller can use the temperature information to control air conditioning and/or heating systems, including ducts and vents via mechanical control systems. The BO switch 102 preferably includes a gasket around the faceplate, to prevent the temperature sensor 310 from sensing temperature of air from inside the wall where the BO switch 102 is mounted, and instead enabling an accurate reading only of the temperature within the office or space.

The A/B lighting switch 202 can further include an override on/off switch for local hard "off," "on" and restarting capability. In some implementations, the A/B lighting switch 202 includes a speaker 312, such as a solid state piezo sounder, for sounding out alarm, status or mode signals, or for broadcasting voice signals, received by the A/B lighting switch via its transceiver. A service port 314 can be provided on the face of the A/B lighting switch, and adapted to receive a service key 316 for the transfer of programming or instruction data via the service key. The service key 316 can include a data communication interface such as a universal serial bus (USB) interface for connecting to a laptop computer or other computing device such as a handheld computing device or desktop computer. In some implementations, when a service key 316 is inserted into the service port 314, the A/B lighting switch automatically enters a "service" mode, in which it can be reprogrammed, updated, or controlled from an external computing source. In other implementations, the service key 316 can be limited to an after-hours service key, which can be inserted into the A/B lighting switch to request after-hours lighting or other service. Accordingly, the A/B lighting switch further includes a processor and memory (not shown) for storing and executing instructions, i.e., from the service key 316 or user-supplied via for optimizing a building.

The A/B lighting switch 202 includes a mounting bracket 318 for mounting the A/B lighting switch 202 in the space of a conventional light switch. The mounting bracket 318 includes a number of holes, each for receiving a screw to hold the A/B lighting switch 202 in place. The mounting bracket 318 can further include breakaway tabs 320 for center mounting of the A/B lighting switch 202 in the space of a conventional light switch. The A/B lighting switch 202 further includes an override off-switch 322 for turning off the function of the A/B lighting switch 202, and/or restarting the A/B lighting switch.

Figure 4:
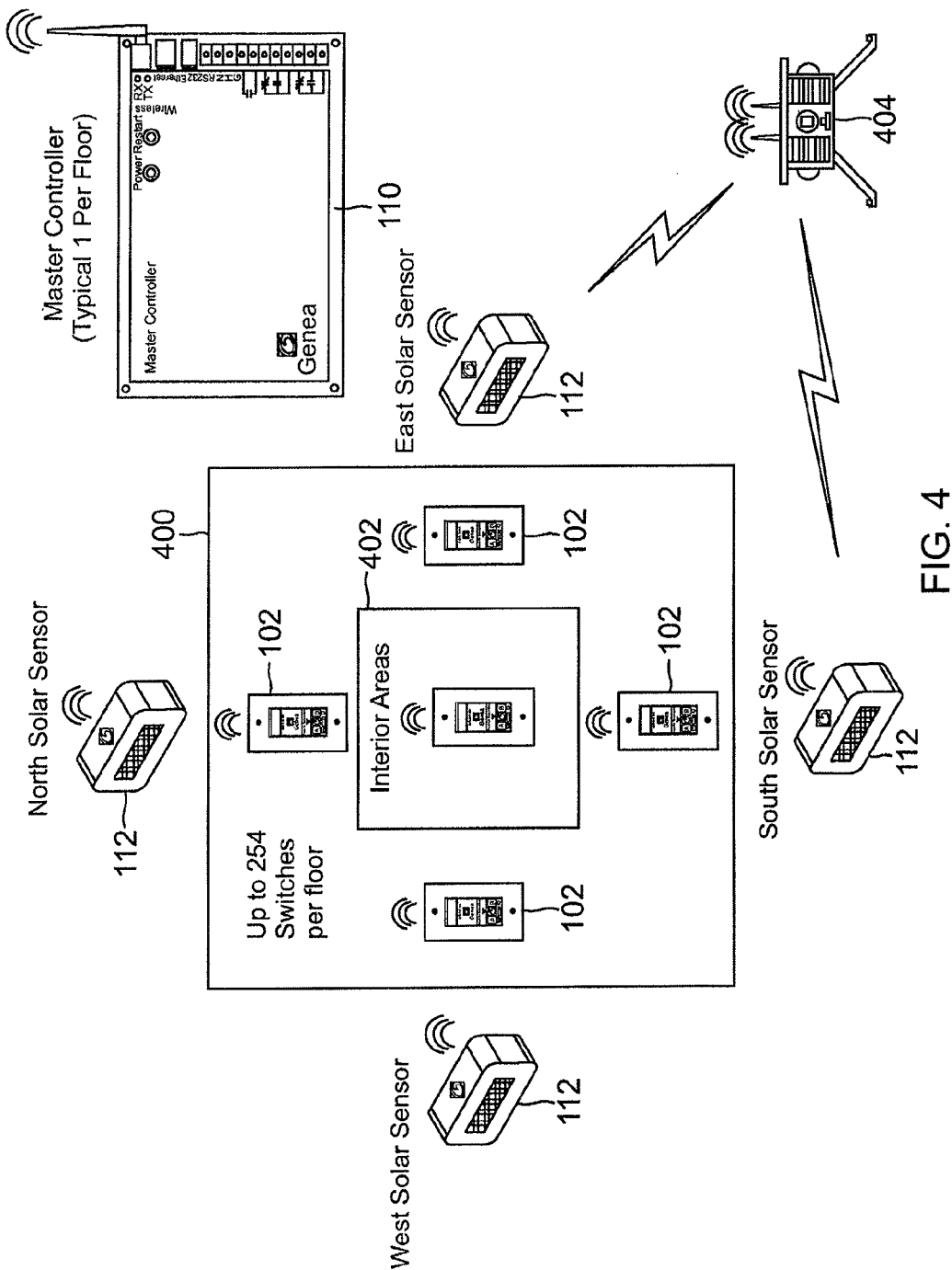
FIG. 4 illustrates one implementation of a building optimization system configuration for a building.

FIG. 4 illustrates one implementation of a BOS configuration for a building 400. The building is segregated into four basic segments: north, south, east and west. These orientations for the segmentation are approximate, and may represent other alignments of the building. Further, the designations of the segments can be changed based on seasonal characteristics and building shape or orientation. Other segregations are possible, such as only east and west, for example. Each segment includes a solar sensor 112 attached to an external surface of the building 400 within the segment. The solar sensor 112 senses an amount of solar light being received by the associated segment, such as full sun, partial sun, ambient light in the shade, etc. Each solar sensor 112 determines light level information from the sensed solar light, and includes a wireless transceiver or transmitter to wirelessly transmit the light level information to the master controller 110, which receives the light level information to generate control signals to control the A/B lighting switches 102 placed at various locations within the building.

In some implementations of the BOS configuration, the solar sensors 112 are installed on the top floor windows. Each floor of the building can include up to 254 A/B lighting switches 102, which includes peripheral areas as well as interior areas 402 of the building 400. In preferred implementations, each floor of the building 400 also includes only one master controller 110, however other configurations may be suitable. The sensors 112 and all other components may communicate with a light weather station 404, preferably located on the roof or other location proximate to the building, for receiving ambient weather condition data, such as temperature, wind speed, barometric pressure, etc., which can affect an algorithm for operating the switches of each floor of the building. All of the components of the BOS configuration communicate wireless via a wireless mesh network. However, other wireless communication technologies may also be used.

The A/B lighting switches 102 can be configured for operating according to a number of different modes. Basic modes are described below, and a person of skill in the art would recognize that the names used for each mode are for illustrative purposes only, and have no limiting effect. Rather, the functionality of each mode is described under general titles. Further, the different modes can have combined or cross-functional capabilities. The A/B lighting switch 102 can be programmed for controlling the A and/or B lights of a room. Further, the A/B lighting switch 102 can also be connected with a binary controller to control blinds and/or windows of a room, or for controlling the opening and closing of dampers, for example. In some implementations, a remote control can be used to control the operations of the A/B lighting switch 102.

The binary controller can take the form of a user-interactive switch controller with user-selectable buttons, for being connected to the A/B lighting switch 202 in the same faceplate, and have the same general form factor. The binary controller can also take the form of a binary control module, which itself has a number of implementations. Each binary control module includes data communication ports on opposite sides of a housing, for simple interconnection and mounting within a building, as will be described and shown in further detail below.

Figure 5:
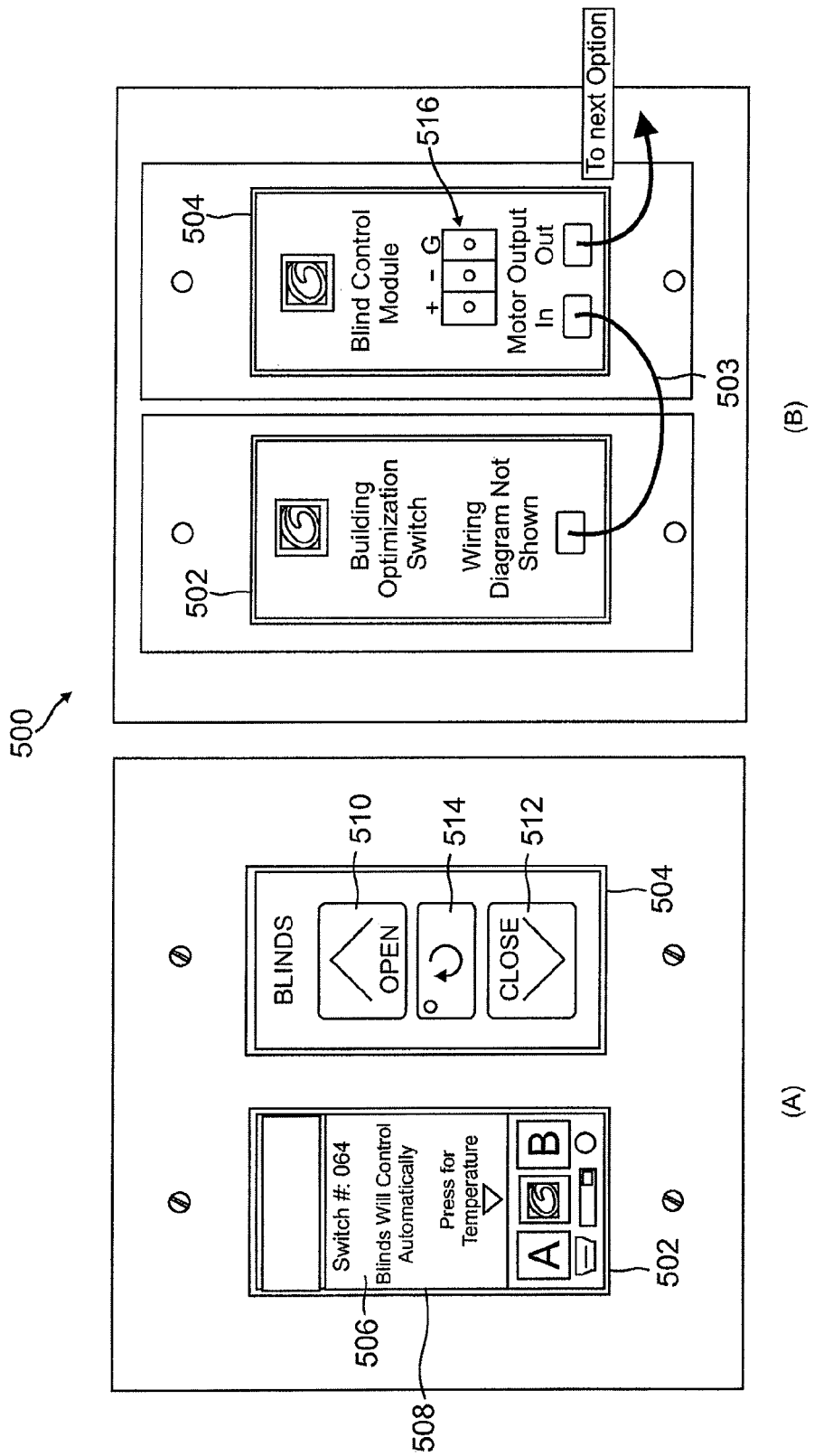
FIG. 5 shows a building optimization system with adaptive blind control.

FIG. 5A shows a BO switch 500 with adaptive blind control. The BO switch 500 includes an A/B lighting switch 502 and a blind control 504. In preferred implementations, each of the A/B lighting switch 502 and blind control 504 are sized and adapted to occupy a single standard light switch slot in a face plate. The A/B lighting switch 502 includes a graphical user interface 506 displayed on a screen 508, as generally described above. The blind control 504 includes a number of control buttons, such as a blinds open button 510, a blinds closed button 512 and general purpose return button 514.

As shown in FIG. 5B, the A/B lighting switch 502 is connected to the blind control 504 by at least one communication link 503. The communication link 503 can be a wired electrical path, or a wireless path. The communication link 503 can communicate signals from the blind control 504 to the A/B lighting switch 502 so that the A/B lighting switch 502 can display status and control information to a user on the screen 508. For example, the A/B lighting switch 502 can display a message to indicate the blinds in an associated room will be controlled automatically based on a user selection of the control buttons on the blind control 504. The screen 508 and graphical user interface 506 can also display a degree, such as a percentage, of how open or closed the blinds are at any given moment. The blind control 504 further includes at least one communication output that can connect the blind control 504 serially to another control or A/B lighting switch 502, and further includes a control output 516 for electrically controlling the mechanical blinds. The control output 516 can also be used as a communication connection to communicate control signals to other devices.

Figure 6:
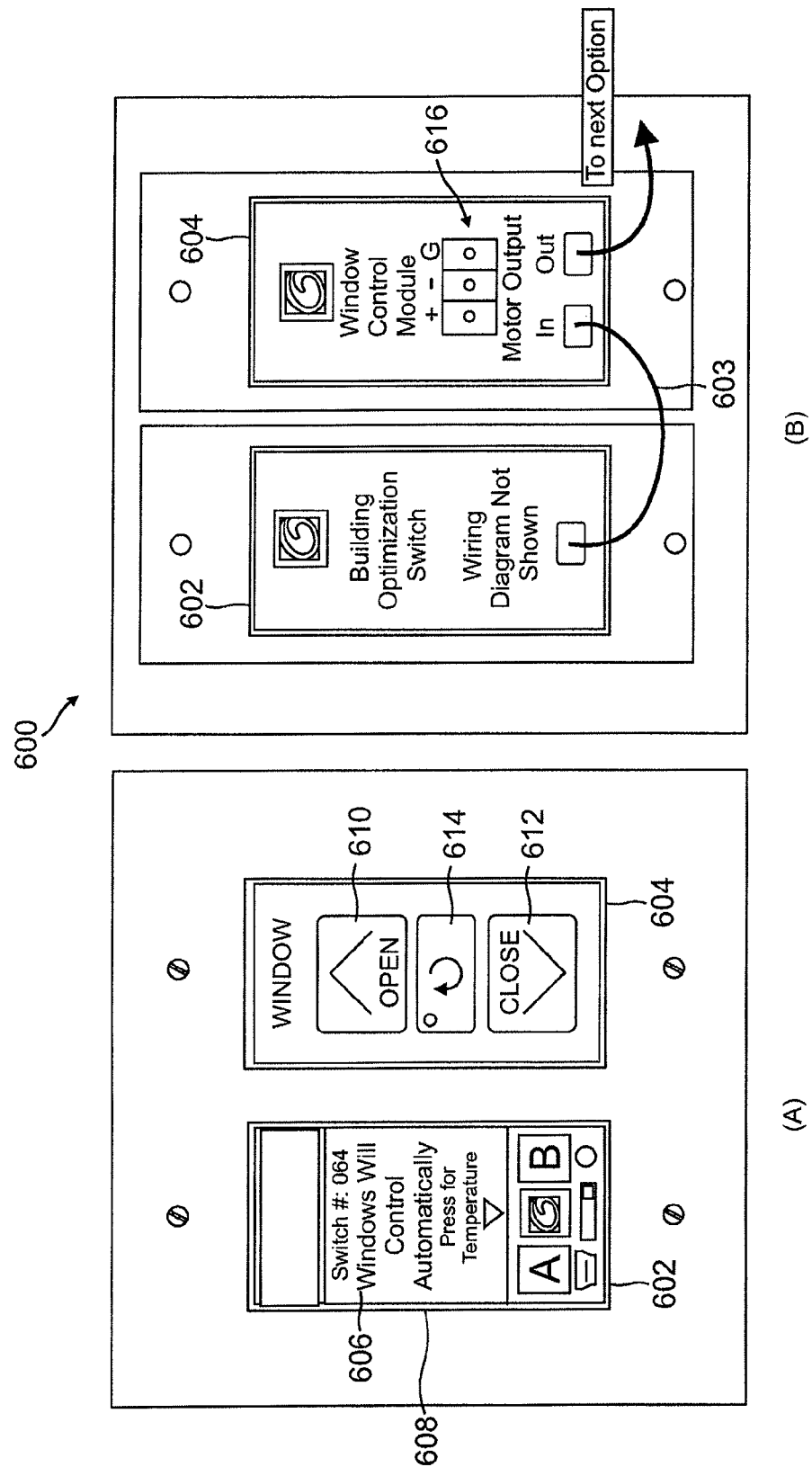
FIG. 6 shows a building optimization system with adaptive window control.

Similarly, a building optimization system can include an adaptive window control 600 as shown in FIGS. 6A-B. FIG. 6A shows a BO switch 600 with adaptive window control, and which includes an A/B lighting switch 602 and a window control 604. In preferred implementations, each of the A/B lighting switch 602 and window control 604 are sized and adapted to occupy a single standard light switch slot in a face plate. The A/B lighting switch 602 includes a graphical user interface 606 displayed on a screen 608, as generally described above. The window control 604 includes a number of control buttons, such as a window open button 610, a window closed button 612 and general purpose return button 614.

As shown in FIG. 6B, the A/B lighting switch 602 is connected to the window control 604 by at least one communication link 603. The communication link 603 can be a wired electrical path, such as a switch bus, or a wireless path. The communication link 603 can communicate signals from the window control 604 to the A/B lighting switch 602 so that the A/B lighting switch 602 can display status and control information to a user on the screen 608. For example, the A/B lighting switch 602 can display a message to indicate the windows in an associated room will be controlled automatically based on a user selection of the control buttons on the window control 604. The screen 608 and graphical user interface 606 can also display a degree, such as a percentage, of how open or closed the windows are at any given moment. The window control 604 further includes at least one communication output that can connect the window control 604 serially to another control or A/B lighting switch 602, and further includes a control output 616 for electrically controlling the windows. The control output 616 can also be used as a communication connection to communicate control signals to other devices.

Figure 7:
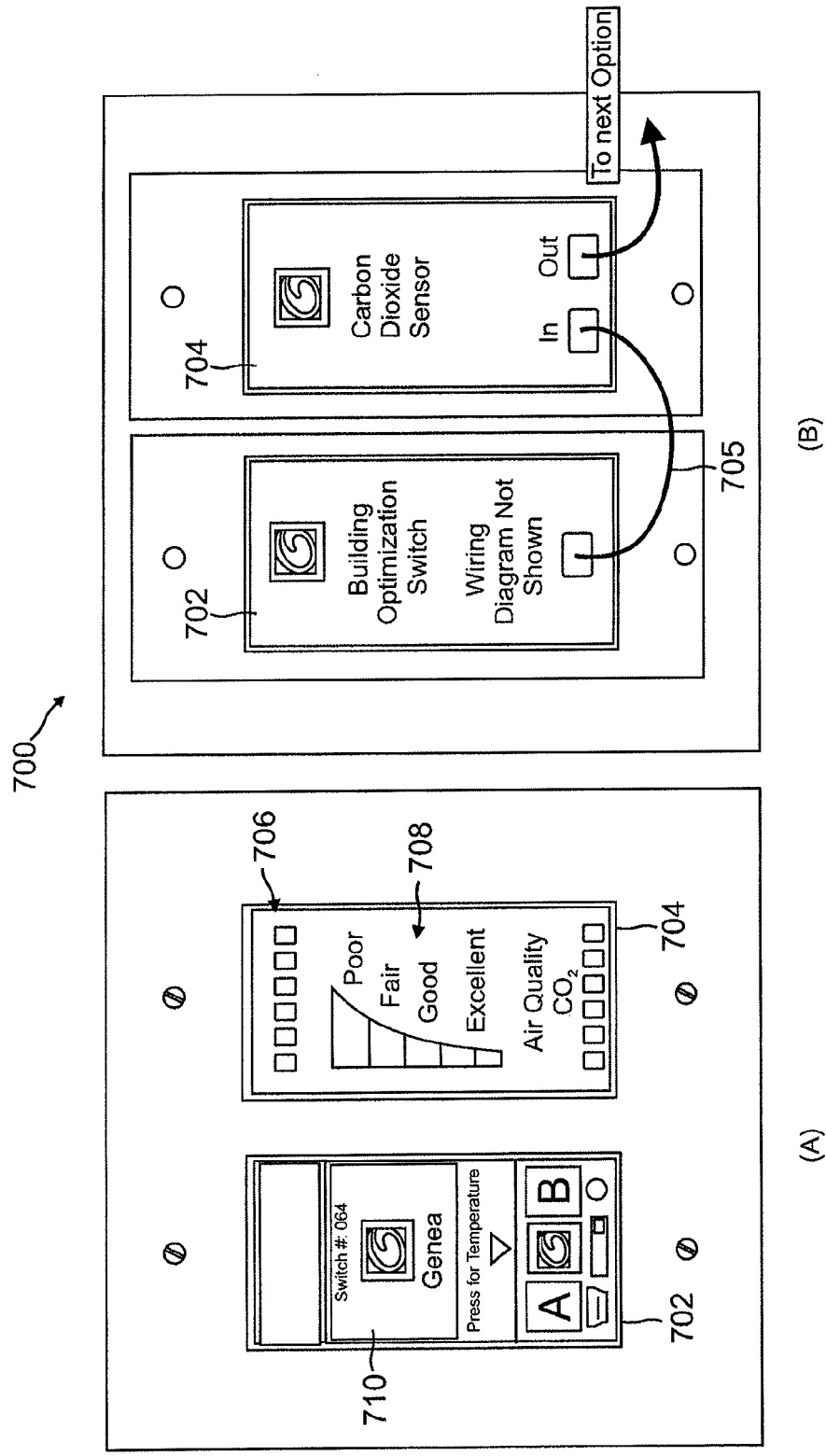
FIG. 7 shows a building optimization system with air quality sensor.

In most conventional buildings, a huge amount of energy is wasted for heating and cooling air in order to meet clean air standards within the building. Accordingly, a building optimization system can include a $CO_2$ sensor and control. FIG. 7A-B show a front view and a back view, respectively, of a building optimization system 700 that includes a A/B lighting switch 702 and a $CO_2$ sensor 704. The A/B lighting switch 702 and $CO_2$ sensor 704 can be sized and adapted to fit within a standard light switch slot in a face plate, and can be connected together in a double-slot face plate, or separately in different face plates.

The $CO_2$ sensor 704 includes one or more sensors 706 for detecting an amount of $CO_2$ in the surrounding air. A measurement logic circuit within the $CO_2$ sensor measures the amount of $CO_2$ detected in the air, and can provide an output representing that measurement. The output can be in the form of an air quality reading 708, or some other graphical or numerical output. The measurement or any other information related to air quality can also be displayed on screen 710 of the A/B lighting switch 702, which can be connected to the $CO_2$ sensor 704 via communication link 705. The measurement of air quality can be transmitted to a master controller or an air conditioning controller for controlling an amount of airflow based on the measurement, such that the airflow efficiency is maximized while air quality standards are still met. The detection of $CO_2$ and measurement of air quality can be performed periodically (i.e. every 10 minutes) or manually by user input (either to the $CO_2$ sensor 704 or to the A/B lighting switch 702), or continuously in an automated process.

Figure 8:
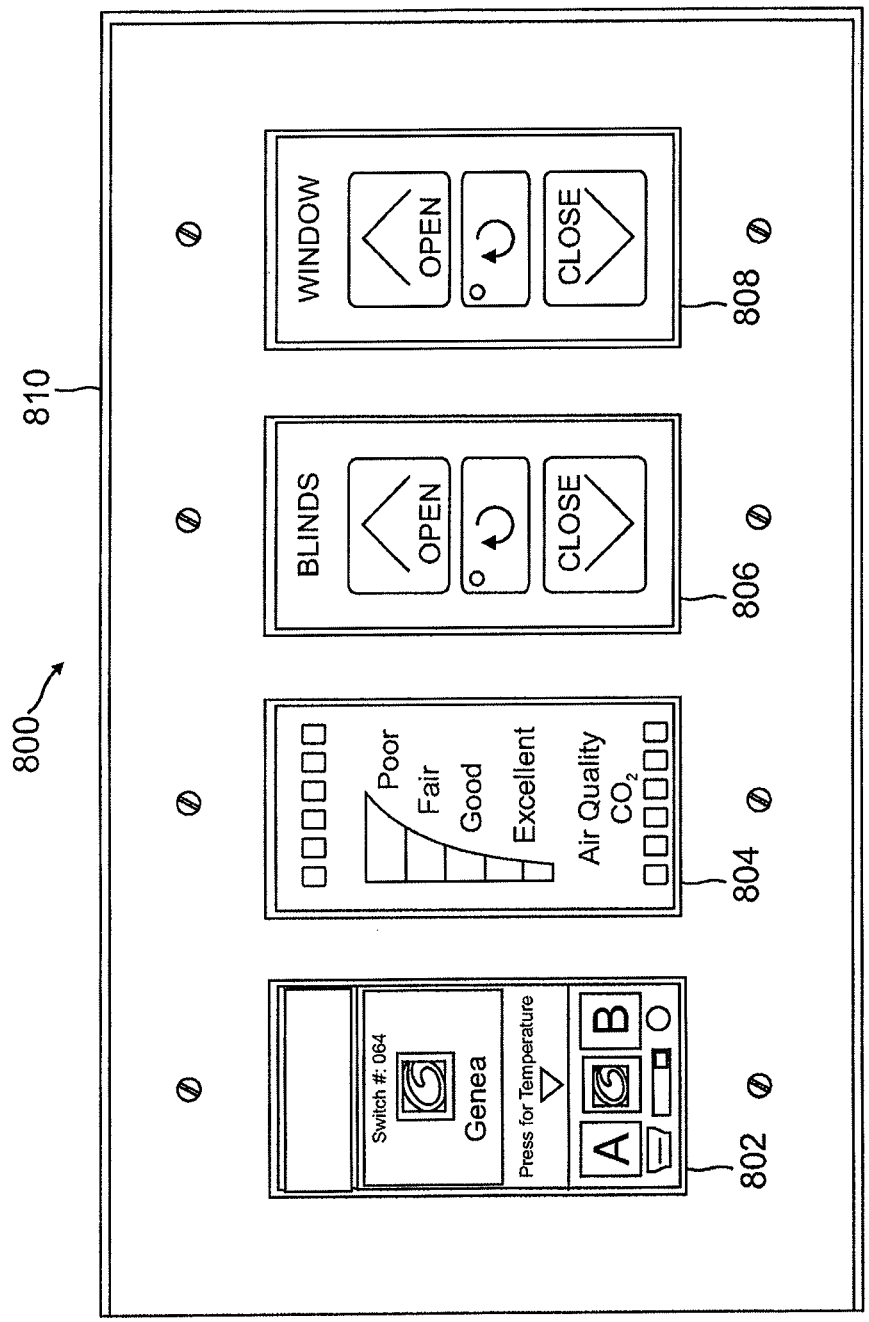
FIG. 8 shows a building optimization system with building optimization switch, air quality sensor, adaptive blind control, and adaptive window control.

FIG. 8 shows a BO switch 800 having a A/B lighting switch 802, a $CO_2$ sensor 804, a blind control 806, and a window control 808, all of which can be integrated and connected together in a common face plate that fits into a wall of a room of a building. The A/B lighting switch 802, a $CO_2$ sensor 804, a blind control 806, and a window control 808 can be connected serially, and each can have its own identifier or data address, such that each can be independently controlled or addressed, particularly if the A/B lighting switch 802, a $CO_2$ sensor 804, a blind control 806, and a window control 808 are all connected together in a wireless mesh network, such as through the A/B lighting switch 802.

Figure 9:
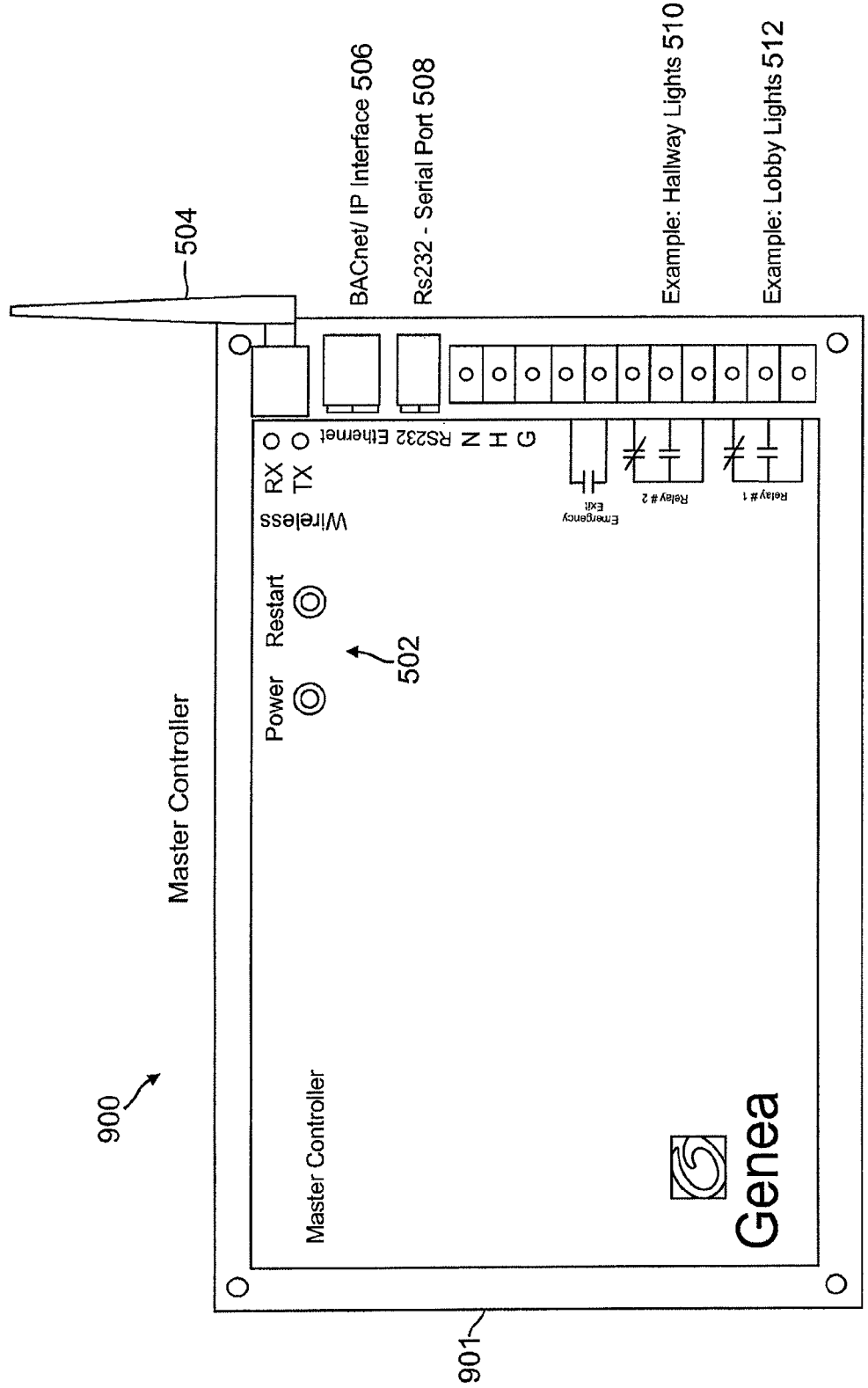
FIG. 9 depicts an exemplary master controller.

A building optimization system can include a master controller. FIG. 9 shows a master controller 900 can include a casing or housing 901, with indicator lights 902. The master controller 900 further includes an antenna 904 for wirelessly communicating with other components of the building optimization system, including one or more A/B lighting switches, window controls, blind controls, etc. The master controller 900 preferably includes an IP interface 906, such as a BACNet connection, and a serial port 908, such as an RS-232 serial port. The master controller 900 further includes one or more switches 910, 912, for controlling the operation of lights outside of a zone associated with a BO switch, such as a lobby or common hallway. A number of master controllers 900, which are preferably all associated with one building, can be connected together through a network switch, such as an Ethernet switch. The network switch can also connect with the Internet, and/or to the building's energy management system, i.e. a server and set of controllers for controlling lighting and/or HVAC systems.

Figure 10:
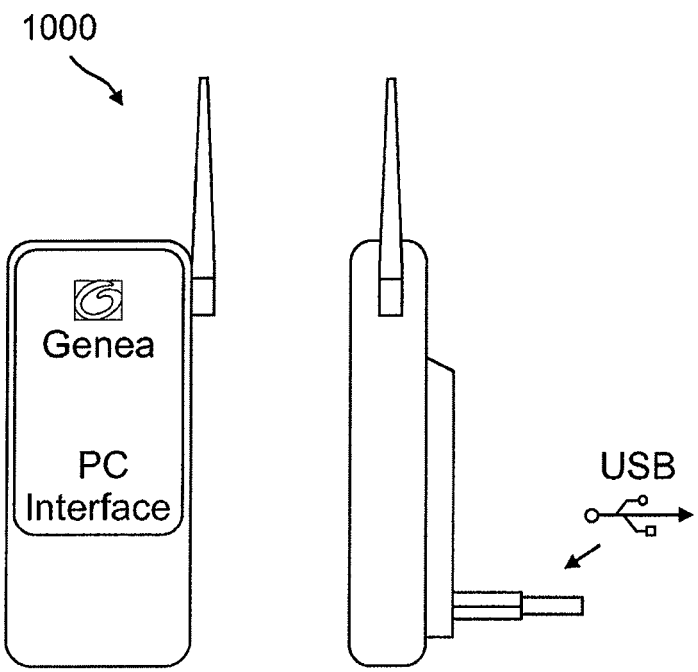
FIG. 10 illustrates a personal computer interface for a building optimization system.

In alternative implementations, a PC interface 1000 can be used for controlling any of the switches or controls, as shown in FIG. 10. The PC interface 1000 can be connected to a personal computer, such as a desktop, laptop or handheld computer, via connector such as a USB port, and, along with software loaded onto the personal computer, can be operated for performing most or all of the functions of a master controller, i.e. to interface with all switches and controls, and for receiving information from sensors, for optimal environmental control of a building. The PC interface 1000 is particularly suited for smaller applications.

Figure 11:
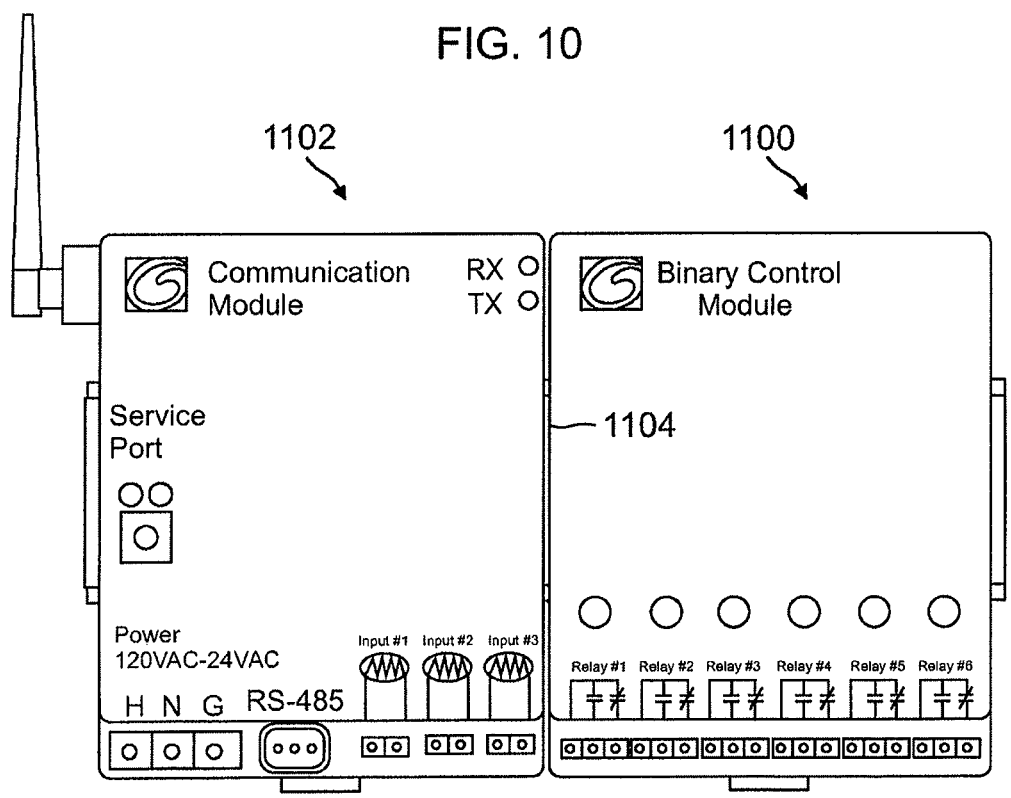
FIG. 11 illustrates a module set with communication module and binary control module.

Some implementations of a building optimization system can include a binary control module 1100, as shown in FIG. 11. The binary control module 1100 is preferably contained in a housing having a two-way communication link 1104 and physical port on opposite sides of the housing, so that it can be connected with a communication module 1102 or other binary control modules 1100. The binary control module 1100 includes a number of relays for connecting and controlling individual electrical devices, such as lights, motorized flues, dampers, switches etc.

The communication module 1102 includes communication processors and an antenna, for wireless two-way communication and control with a master controller, or one or more BO switches, for adaptive zone control of a building. The communication module 1102 can also include a service port for receiving a fob, which can program the communication module 1102 or receive a data download from the communication module 1102. The interconnected devices can be attached to a standard din rail in the data closet of a building, for example, for ease of installation and use. The two-way communication link 1104 can also include a USB port.

Accordingly, no cabling or difficult wiring is necessary to connect the devices, and they can be interconnected in any order.

Figure 12:
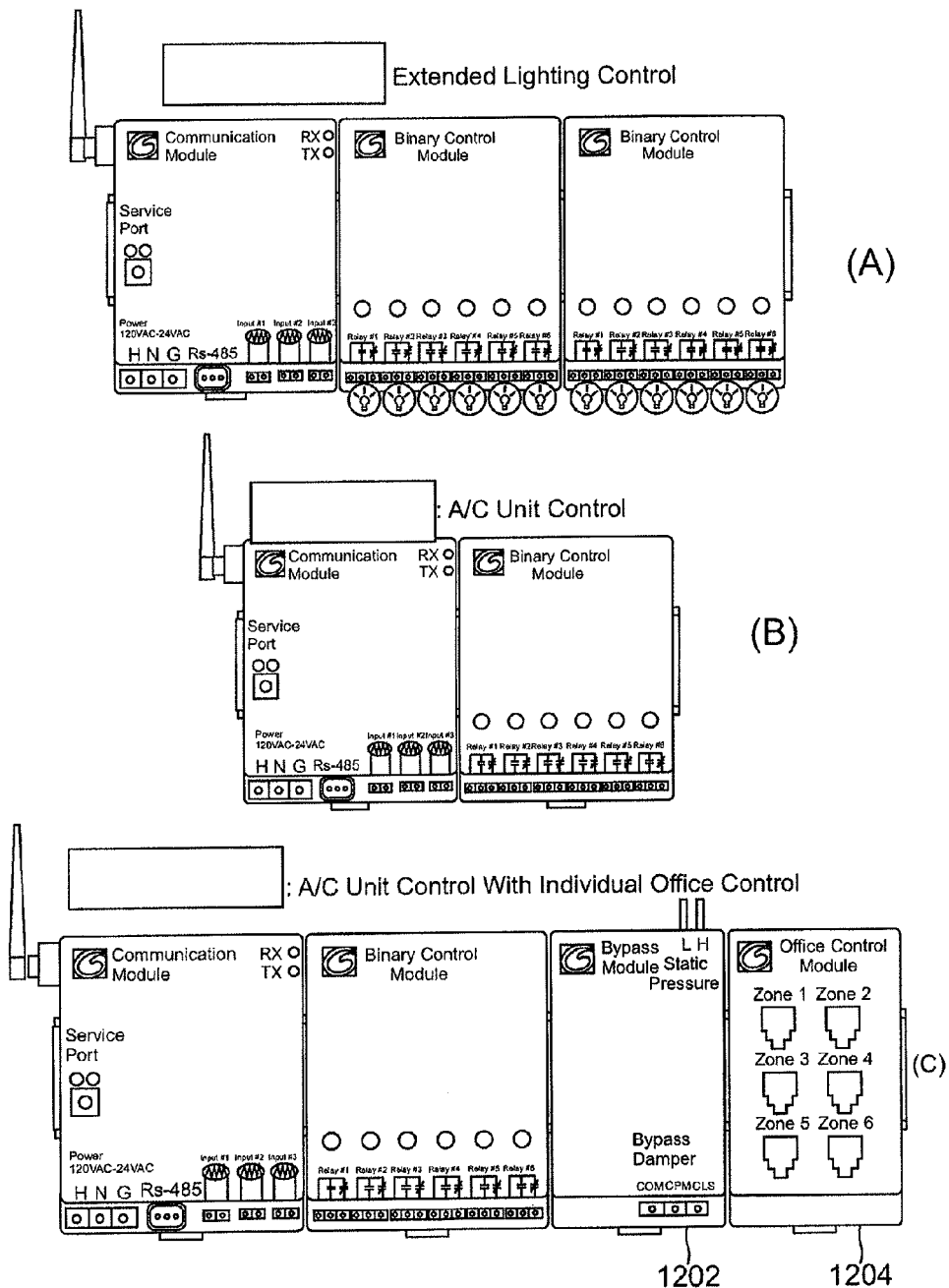
FIGS. 12A-F illustrate various combinations of module sets.

FIGS. 12A-F illustrate various applications of a binary control module 1100. FIG. 12A shows an extended lighting control system having two binary control modules connected together with a communications module. Each of the binary control modules can control separate lighting banks, i.e. in separate geographic locations, or on different floors, in different buildings, etc. FIG. 12B shows a binary control module being used for A/C unit control. FIG. 12C illustrates a binary control module being used for A/C unit control, and including a bypass module 1202 that includes sensors for sensing high and low static pressure and a bypass damper control output that can be connected to control a bypass damper of an A/C unit. The system of FIG. 12C also includes an office control module 1204 to communicate with and control independent zones or offices via individual telecommunications links. FIG. 12D shows a module set that includes a communication module and a VAV module 1206 for controlling a variable volume (VAV) terminal, or "VAV box." The VAV module includes low and high velocity sensors for differentially determining a velocity within a conduit, a valve control, and a damper control. The module set in FIG. 12D can be used with an office control module, as shown in FIG. 12E. FIG. 12F shows a multiplexed zone controller, which uses multiplex technology to efficiently control a number of individual zones with only one input (velocity sensing) and one output (damper control). Other various combinations of modules are also possible.

Figure 13:
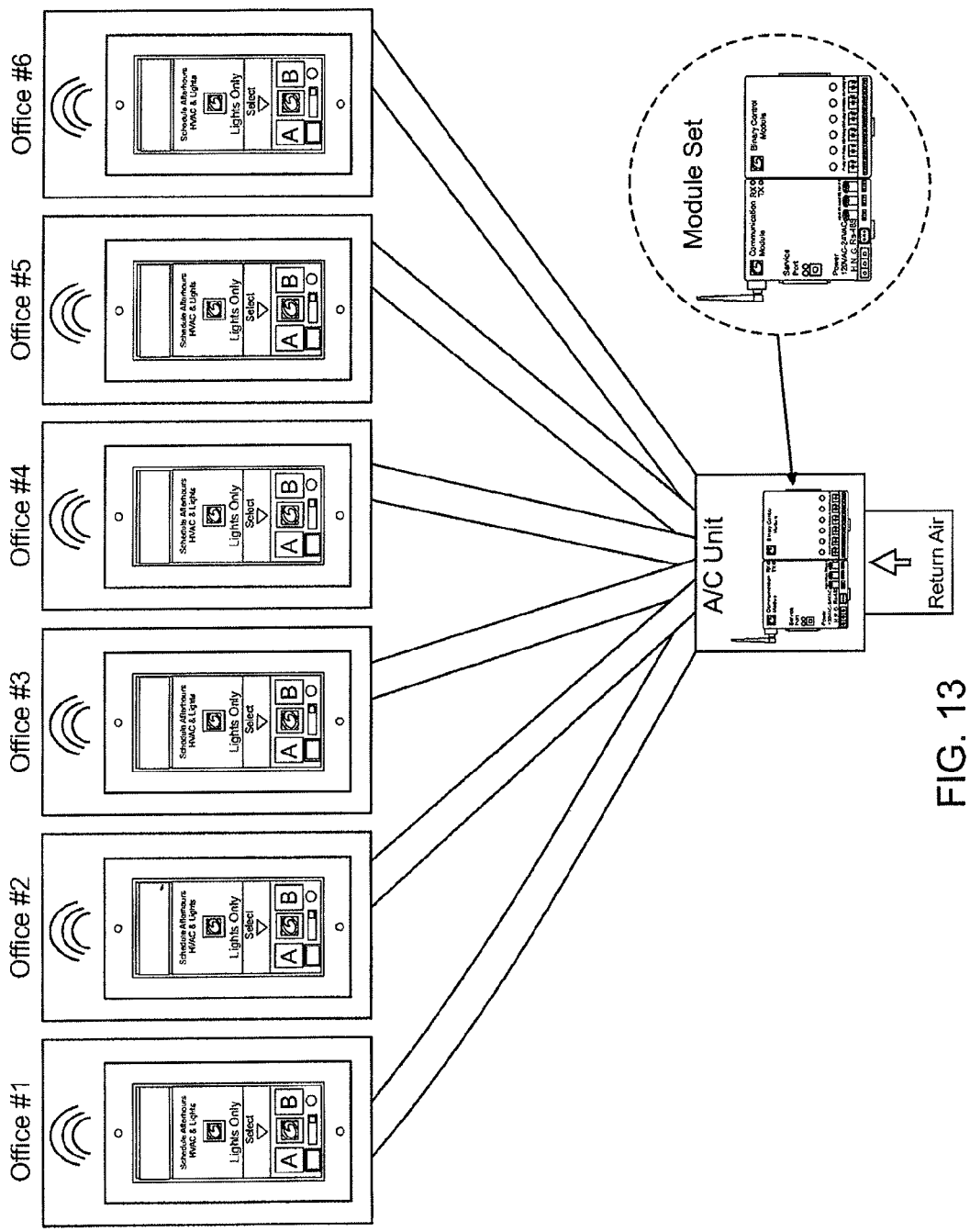
FIGS. 13-20 illustrate a number of exemplary applications of various control module sets for zone control.
Figure 14:
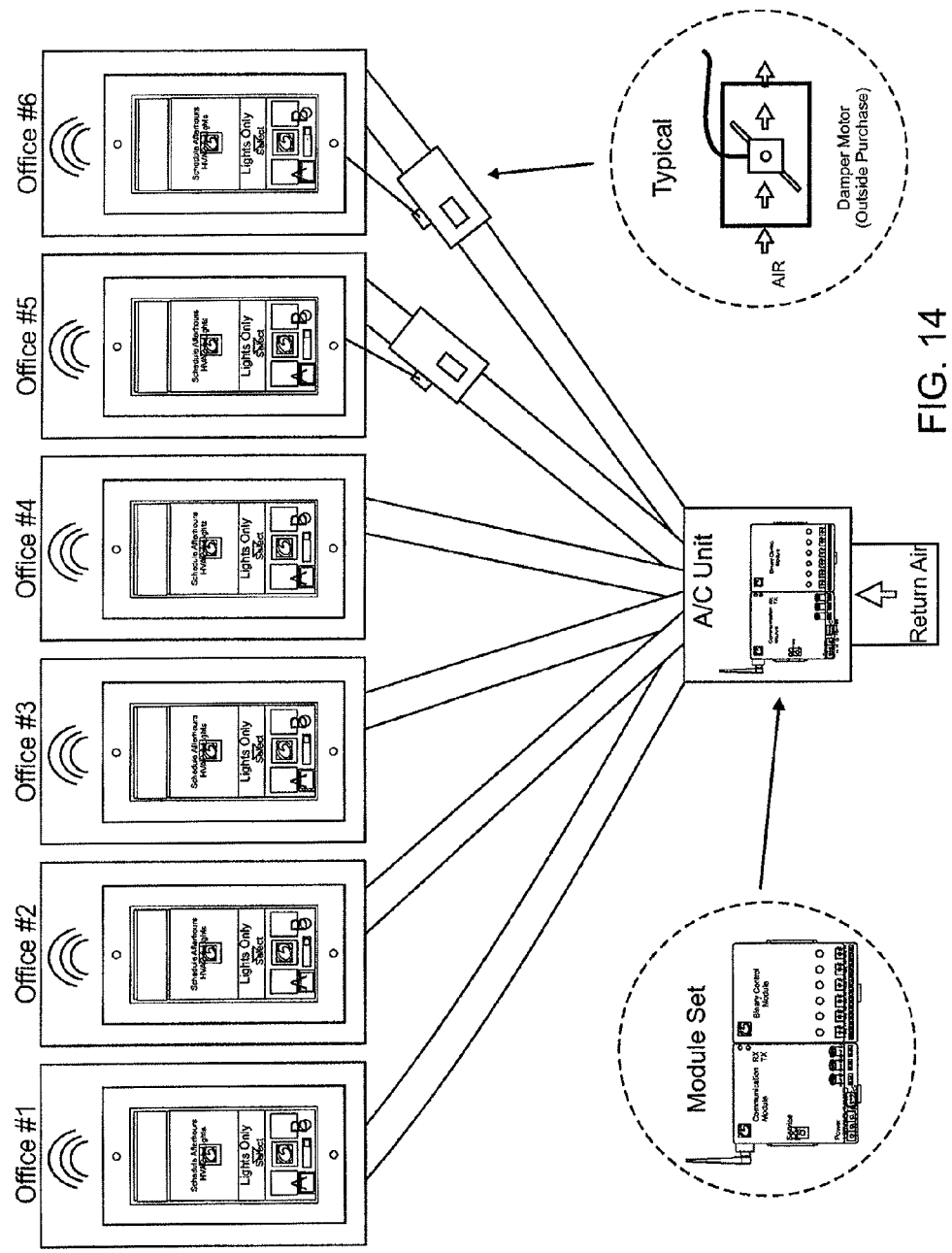

FIG. 13 further illustrates a binary control module and a communication module installed in an A/C unit and connected to a number of individual BO switches residing in respective individual offices. All switches and controllers are self-powered by the lighting wiring, and thus do not require network or power wiring. Each of the BO switches influences how the A/C unit controls a set point in each respective office, via the binary control module and communication module set. FIG. 14 shows a similar arrangement, but including a damper attached to a number of the air conduits. The damper is controlled by a damper motor, which is in turn electrically governed by a BO switch, as instructed locally or via the module set (i.e. binary control module connected with communication module, or any other combination of modules as described above).

Figure 15:
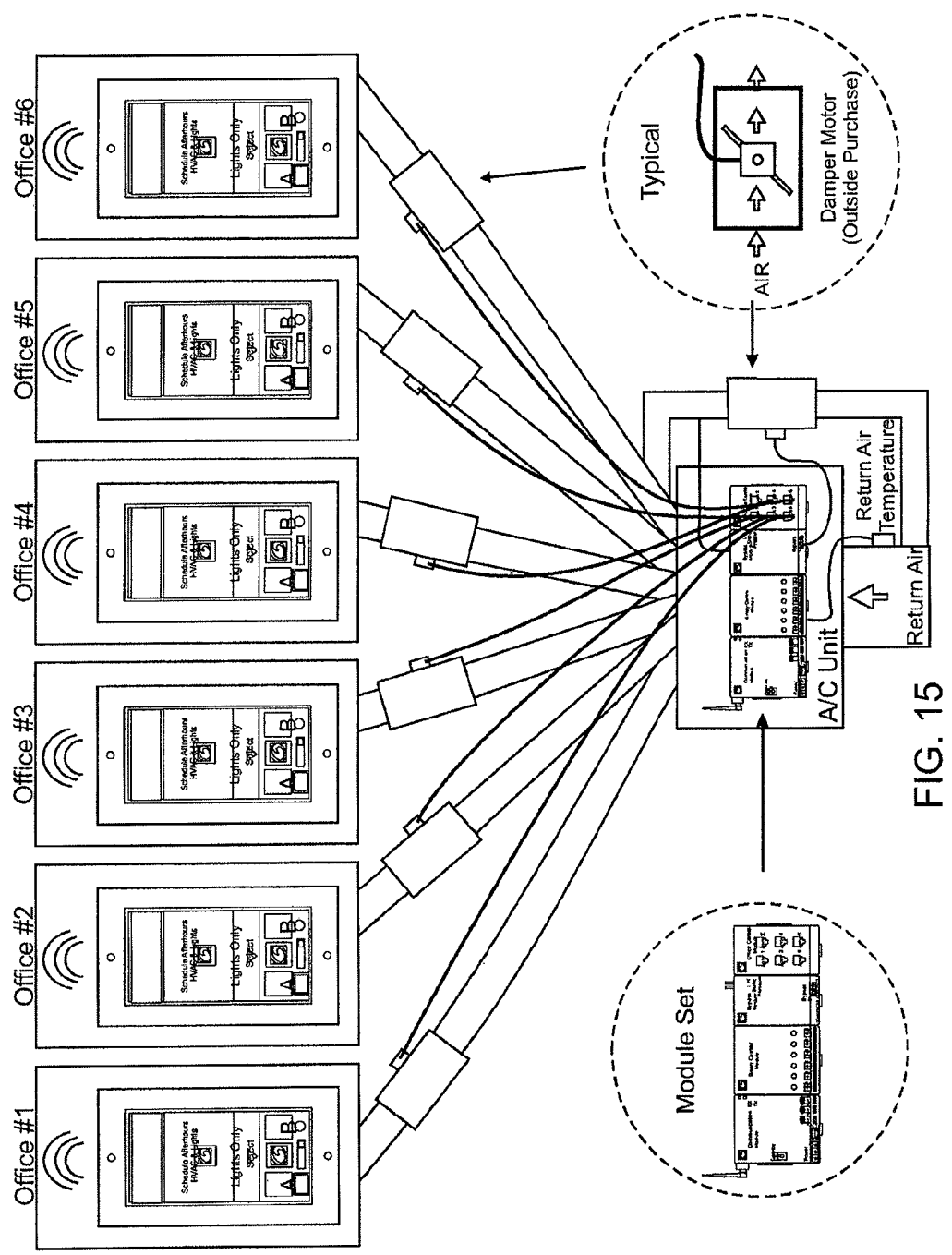
Figure 16:
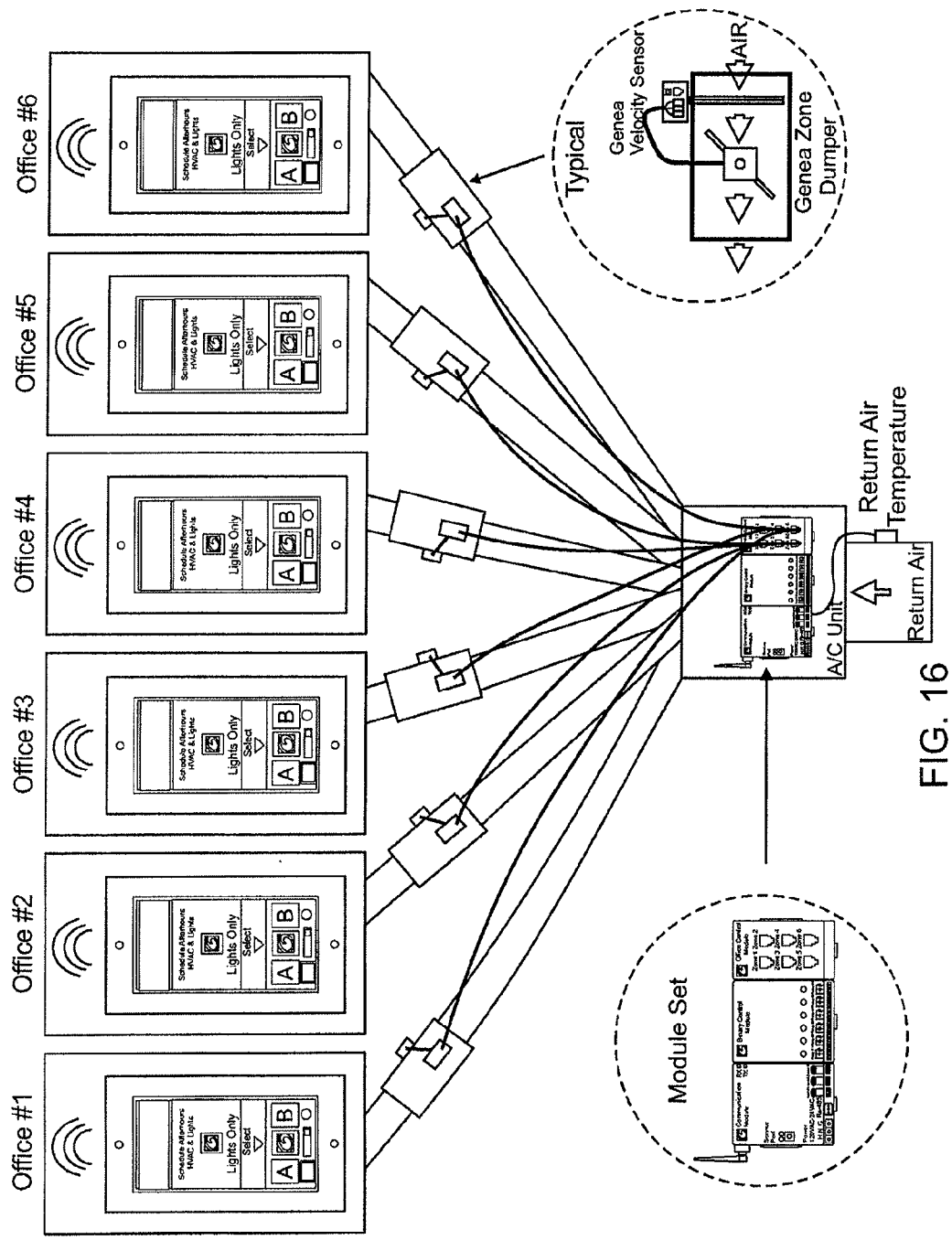
Figure 17:
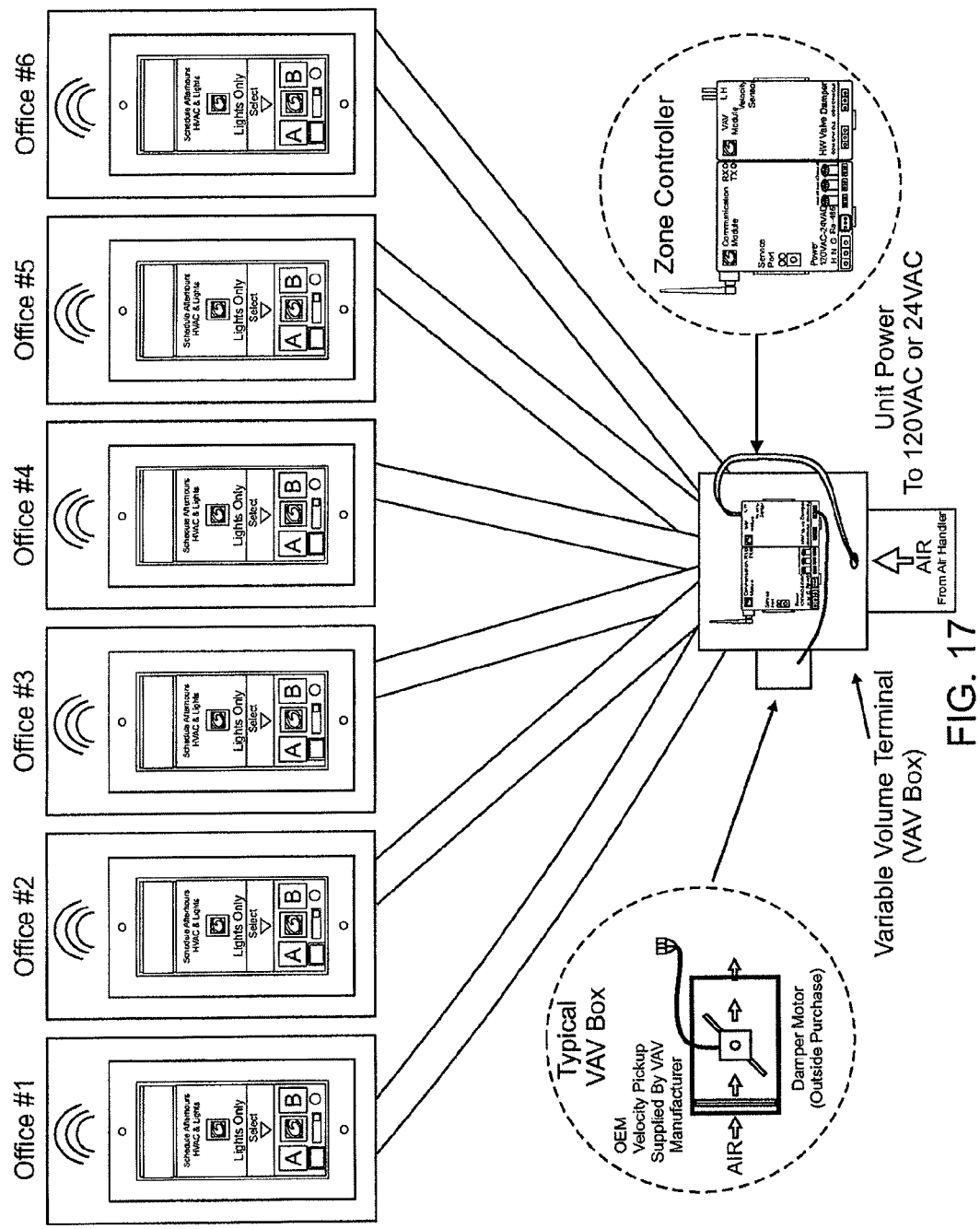
Figure 18:
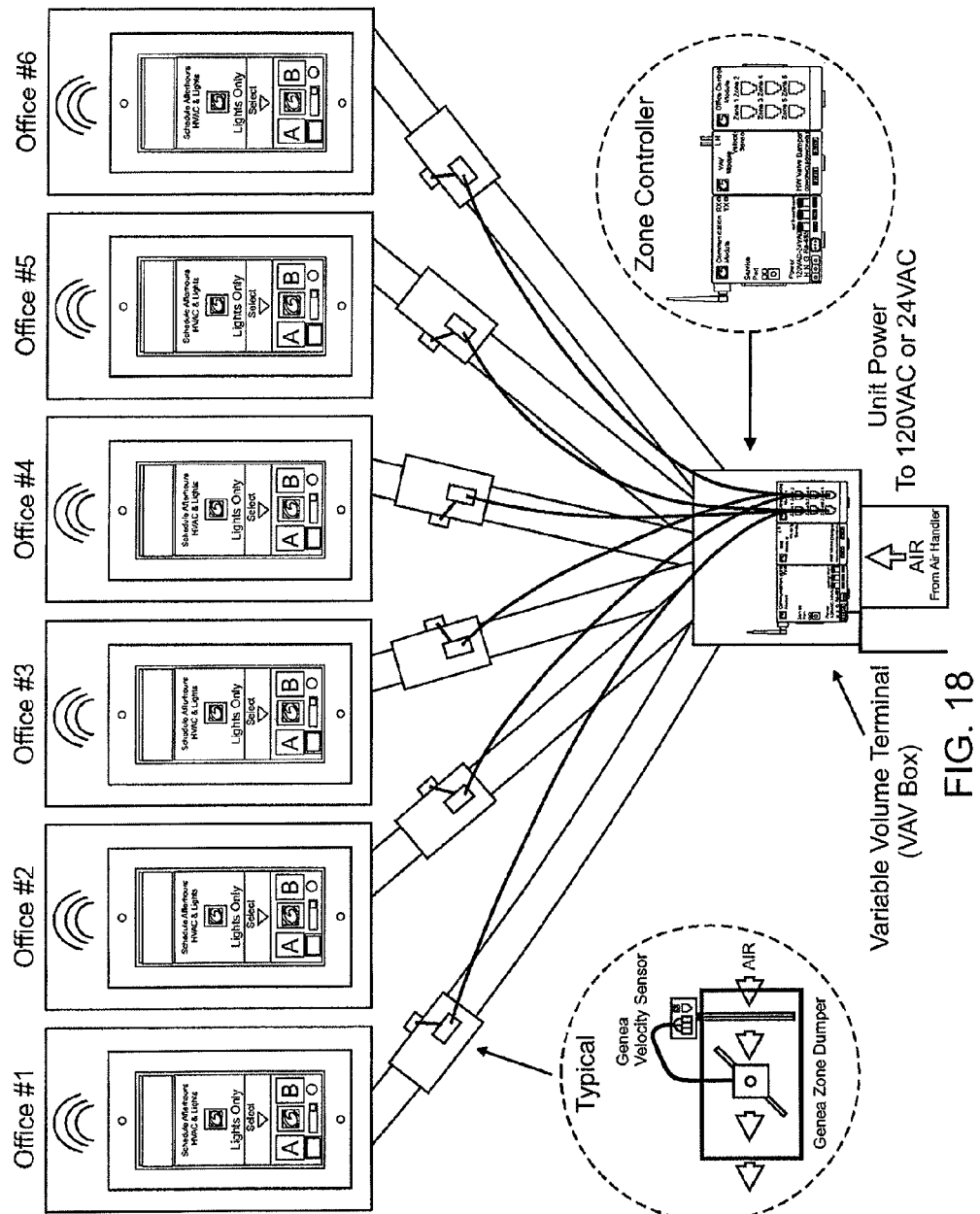
Figure 19:
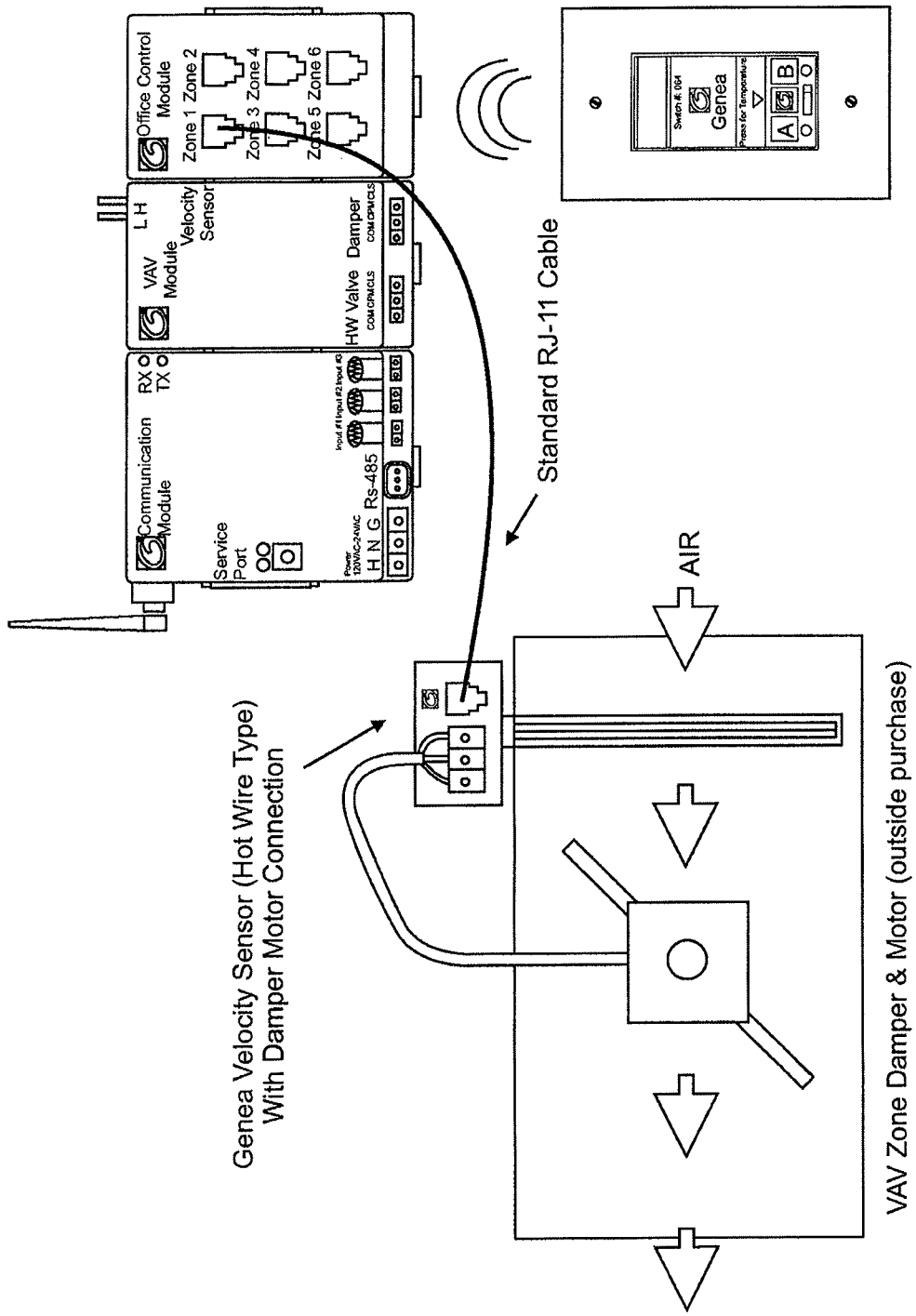
Figure 20:
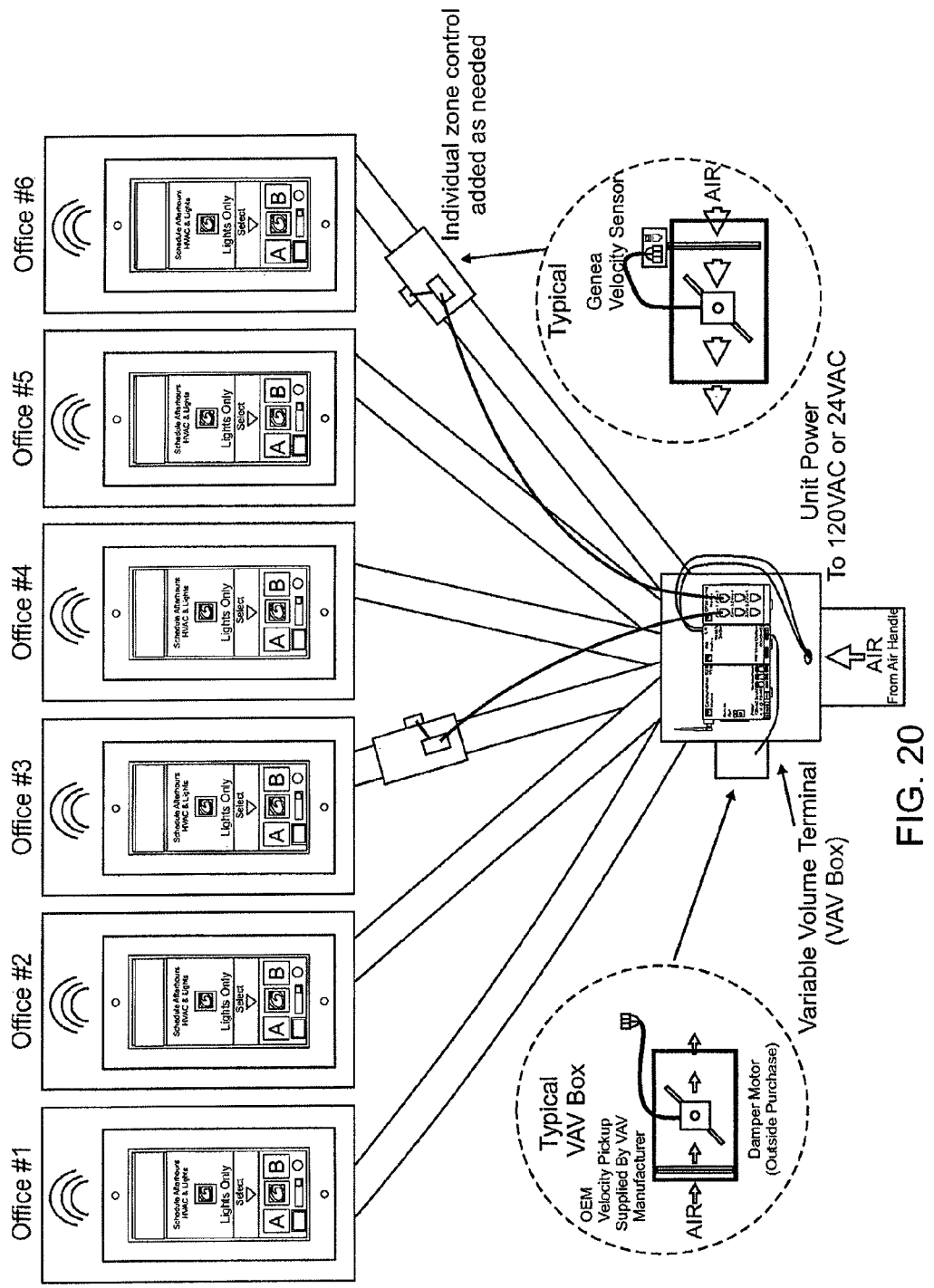

FIG. 15 shows yet another arrangement for use with an A/C unit in which each air conduit includes its own damper, and including a bypass conduit that is used in case the dampers to all offices are in a closed position. Pressure in the bypass conduit is measured by a bypass module, which in turn controls the damper in the bypass conduit. The office control module is connected to each damper for individual damper control. FIG. 16 shows another arrangement similar to the arrangement shown in FIG. 15, but using a velocity sensor in each conduit to provide to the module set to control each zone damper. FIG. 17 illustrates the use of the module set shown in FIG. 12D for controlling a variable volume (VAV) terminal, or "VAV box," for single point of controlling air flow to multiple zones or offices. This arrangement uses a VAV module having an input for sensing and measuring air velocity through a conduit, and a control communication output that controls the damper of the VAV box based on the measured velocity. FIG. 18 illustrates a module set in a VAV box, where the module set includes a VAV module and an office control module for controlling individual dampers on each individual conduit. FIG. 19 illustrates an example of a multiplexed zone controller module set for controlling multiple dampers using input data from a single VAV box.

Figure 21:
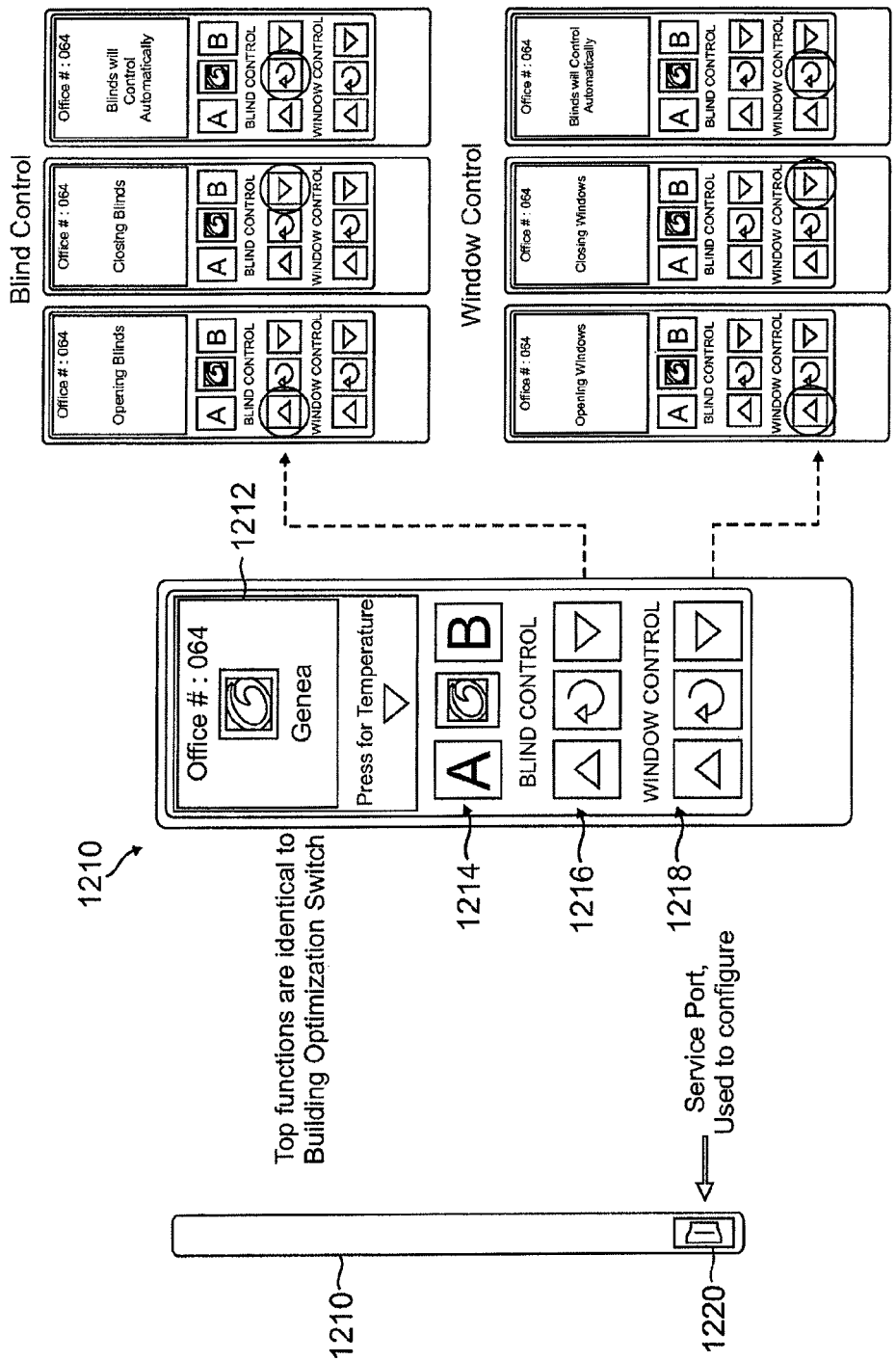
FIGS. 21 and 22 illustrates a zone remote.

The switches, sensors and controls in each zone or office of a building can be controlled by a zone remote. FIG. 21 shows a side view and front view of a zone remote 1210. The zone remote 1210 includes a screen 1212 for displaying a graphical user interface, and a number of function buttons. An A/B lighting switch button set 1214, together with the screen 1212, functions identically to the buttons and screen of a A/B lighting switch as described above. A blind control button set 1216 controls selected blinds in a zone, and a window control button set 1218 controls selected windows in a zone. The zone remote 1210 can further include a service port 1220 for configuring the zone remote from an external programming source, or for charging a battery of the zone remote 1210. FIG. 21 also shows various exemplary graphics and text messages in the screen 1212 based on a user selection of specific buttons in the various button sets.

Figure 22:
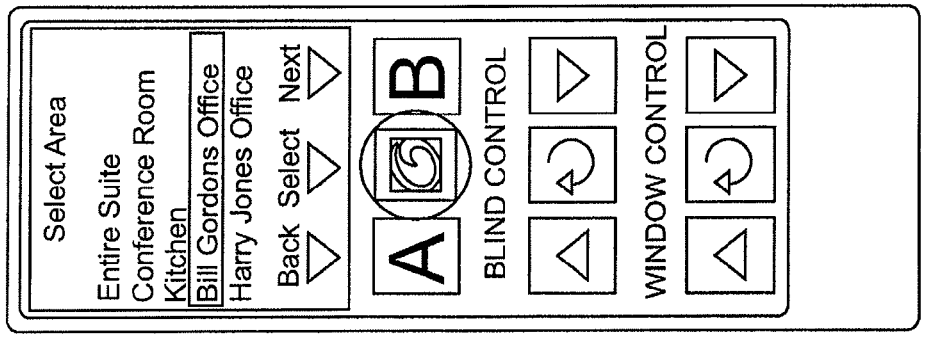
Figure 22:
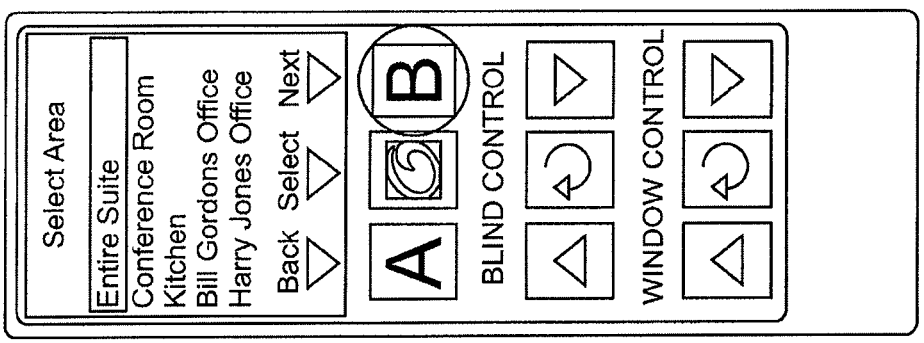
Figure 22:
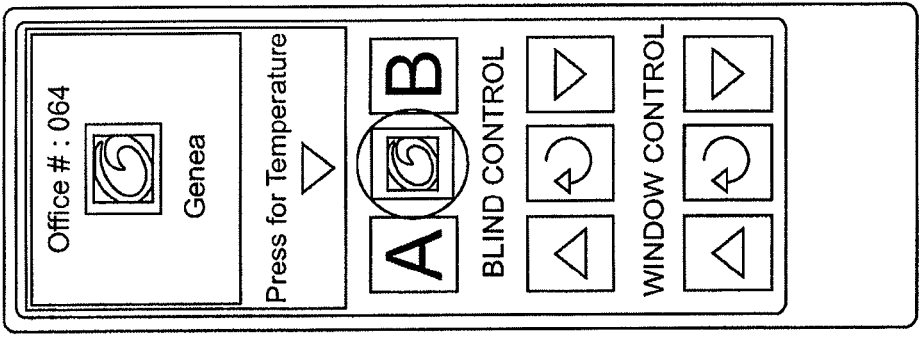

Each zone remote can be programmed to be a master remote. A master remote enables an office manager to have the ability to control their entire suite or a specific office from a single interface. For example, to control a selected area, the mode button can be pressed for a predetermined length of time (i.e. 5 seconds) to activate the "select area" menu, as shown in FIG. 22A. To select a different area, the "next" button can be pressed until the desired area is highlighted, as shown in FIG. 22B. Finally, once highlighted, the "select" button can be pressed to select the desired zone, as shown in FIG. 22C.

Figure 23:
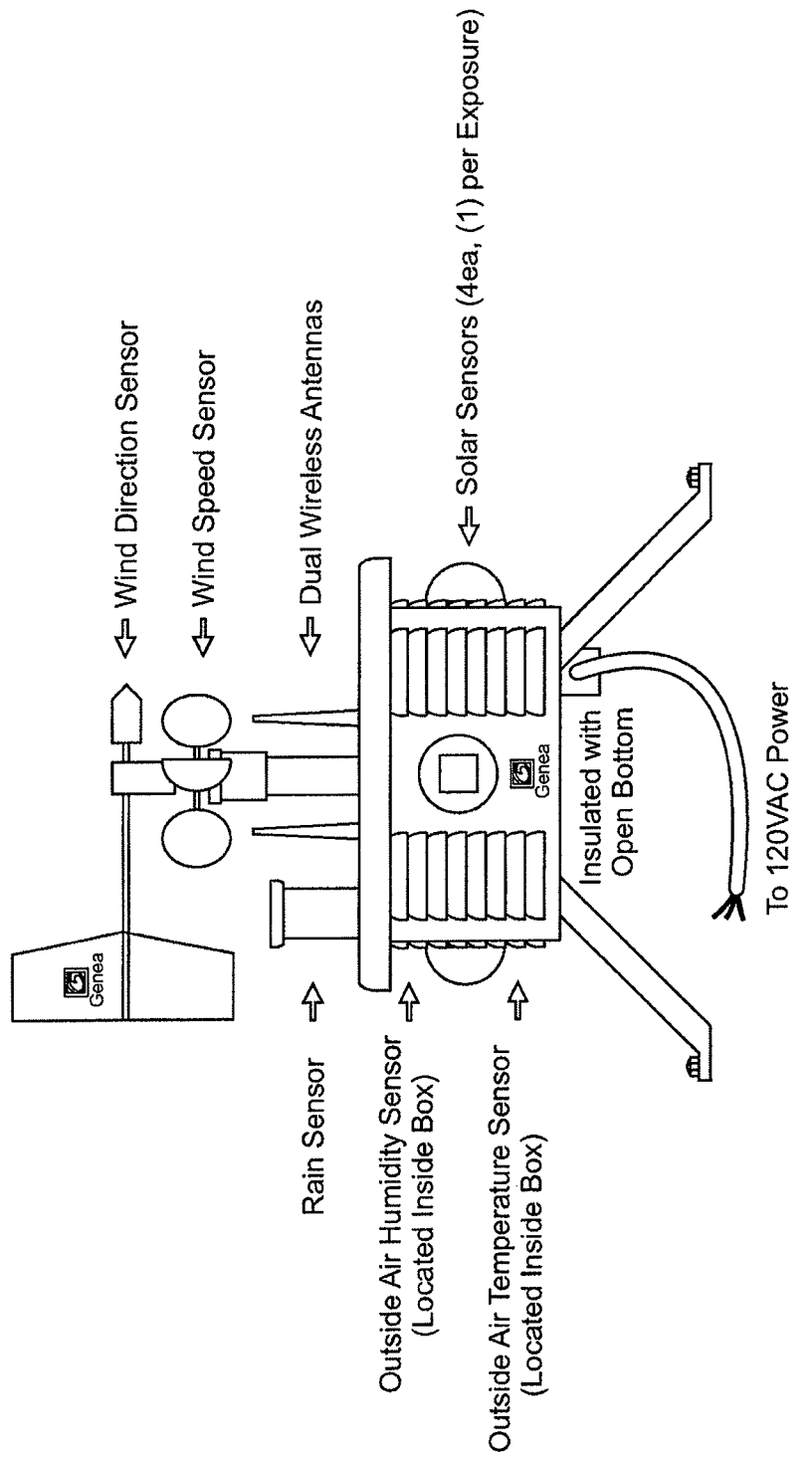
FIGS. 23 and 24 show two alternatives of exemplary weather stations for use with a building optimization system.
Figure 24:
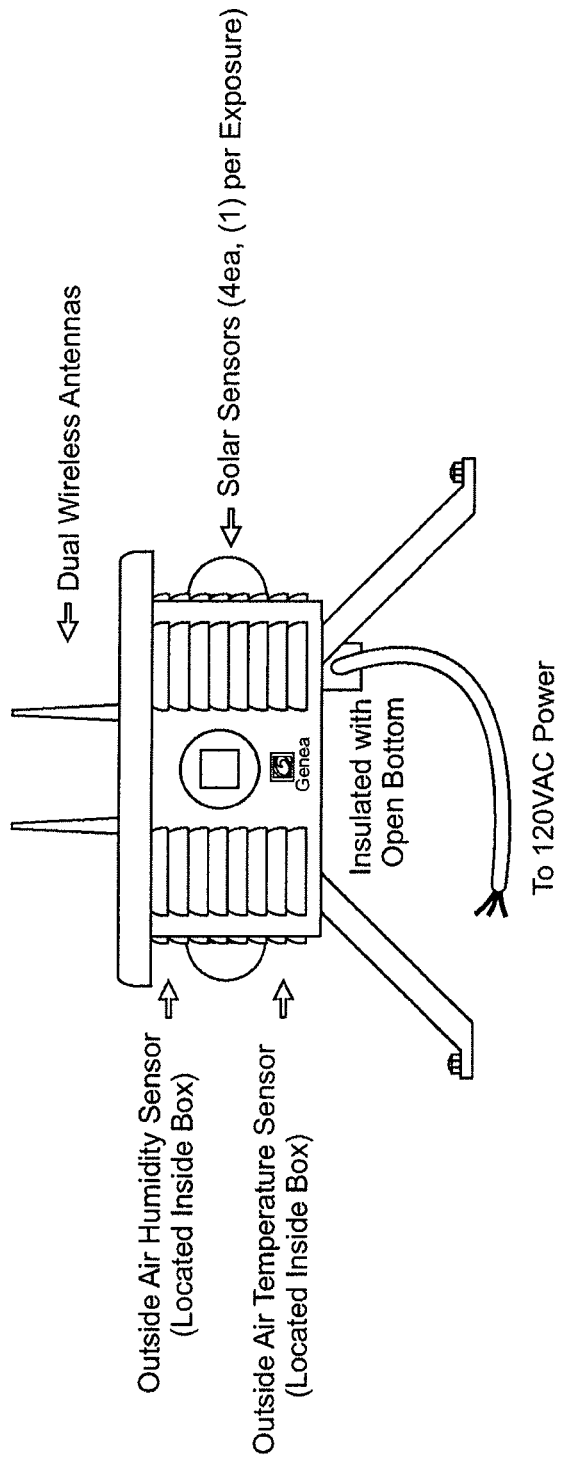

As described in U.S. patent application Ser. No. 12/033, 831, filed Feb. 19, 2008, and entitled BUILDING OPTIMIZATION SYSTEM AND LIGHTING SWITCH, the contents of which are hereby incorporated by reference for all purposes, the BO switch and BO systems can utilize input from a variety of sensors that sense ambient light levels, temperature, human body movement, and other variables. In some implementations, a specialized weather station can be used to collect, measure and provide a variety of data to the building optimization system, in order to optimally match a building's controlled use of lighting, heating and air systems to any given atmospheric or current weather conditions or demands. FIG. 23 shows an example of a full-featured weather station, that can be placed on a roof of a building, for example, or can be installed in a location remote from the building. FIG. 24 shows an example of a light weather station that includes air humidity, air temperature, and solar sensors, and a wireless communication system for transmitting sensed and measured data wirelessly to a master controller and/or any selected BO switch or other controller.

Figure 25:
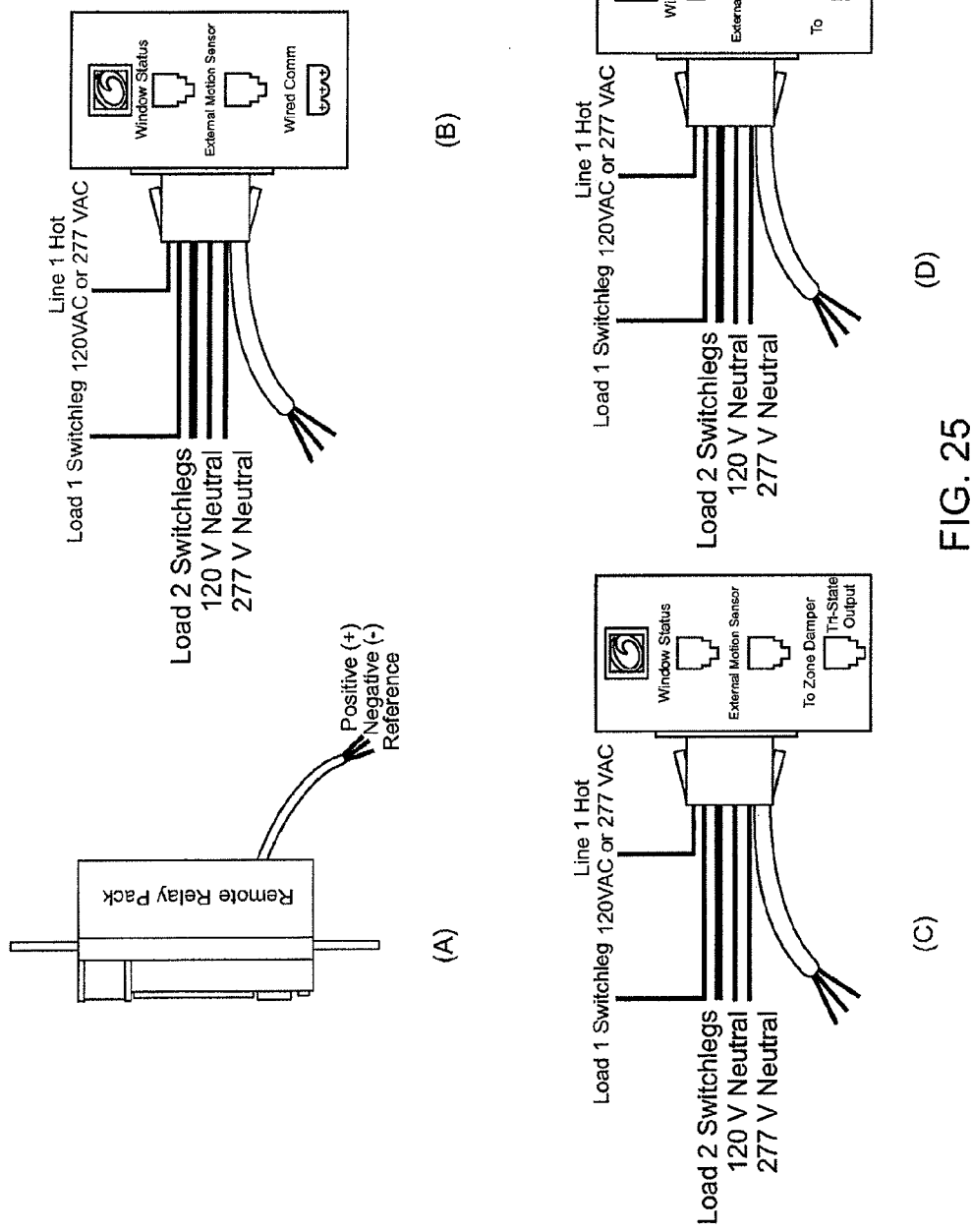
FIG. 25 illustrates various remote switchpacks.

The building optimization system provides for modular and scalable control of a building's energy use and efficiency. The modularity and scalability is enabled at least in part by a number of switchpacks, as shown in FIGS. 25A-C. FIG. 25A shows a remote relay pack module coupled to a A/B lighting switch. FIG. 25B shows a remote switchpack with a window status communication interface, an external motion sensor communication interface, and a wired communication interface. FIG. 25C shows a similar remote switchpack as in FIG. 25B, but with a zone damper communication interface. The zone damper communication interface is preferably a tri-state output communication interface. FIG. 25D shows yet another remote switchpack, with a wired communication interface, an external sensor communication interface, and a dimmable ballast communication interface. Other combinations of communication interfaces in a remote switchpack are possible.

Figure 26:
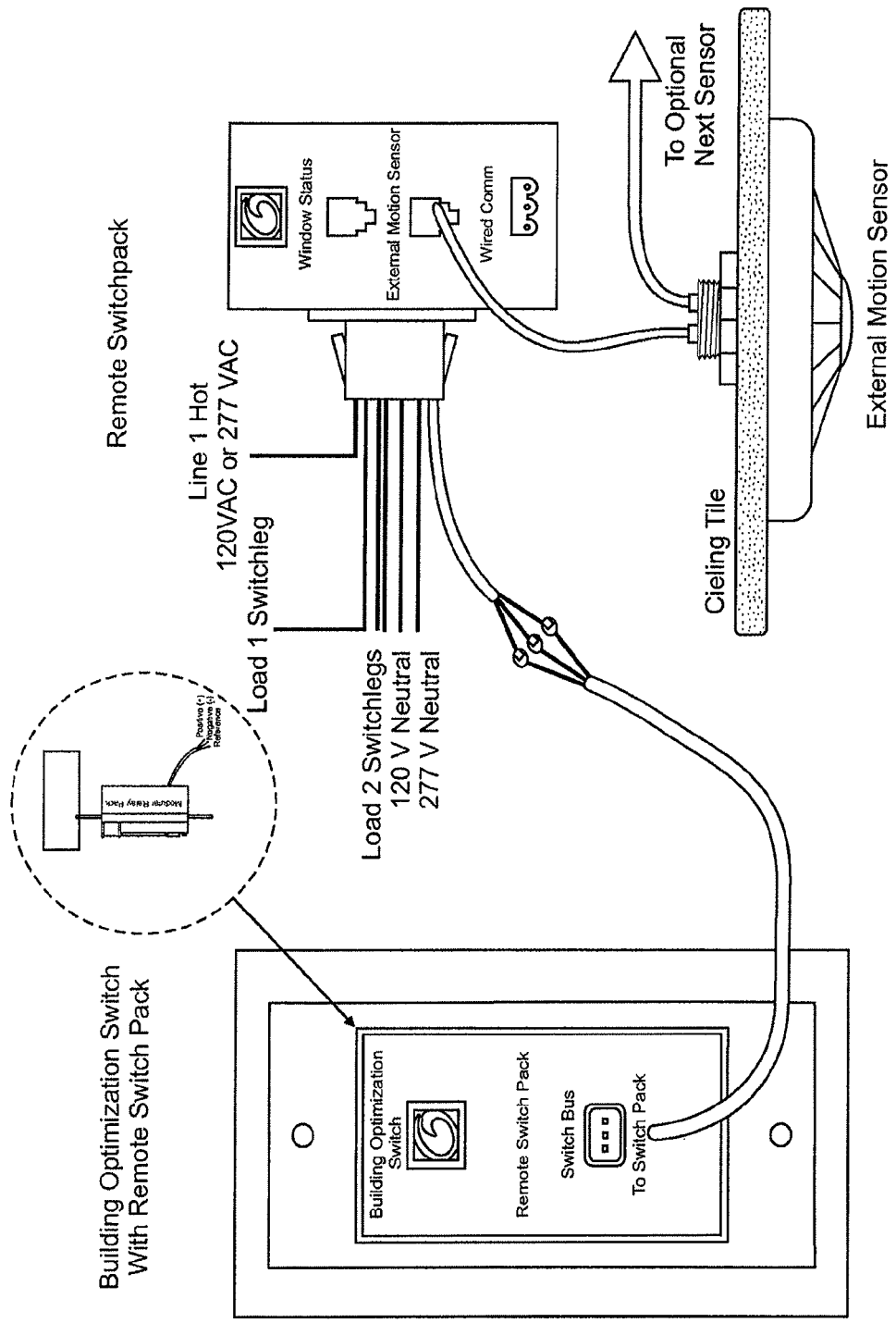
FIGS. 26-29 illustrate various remote switchpacks for connecting and communicating with various sensors and/or motors.
Figure 27:
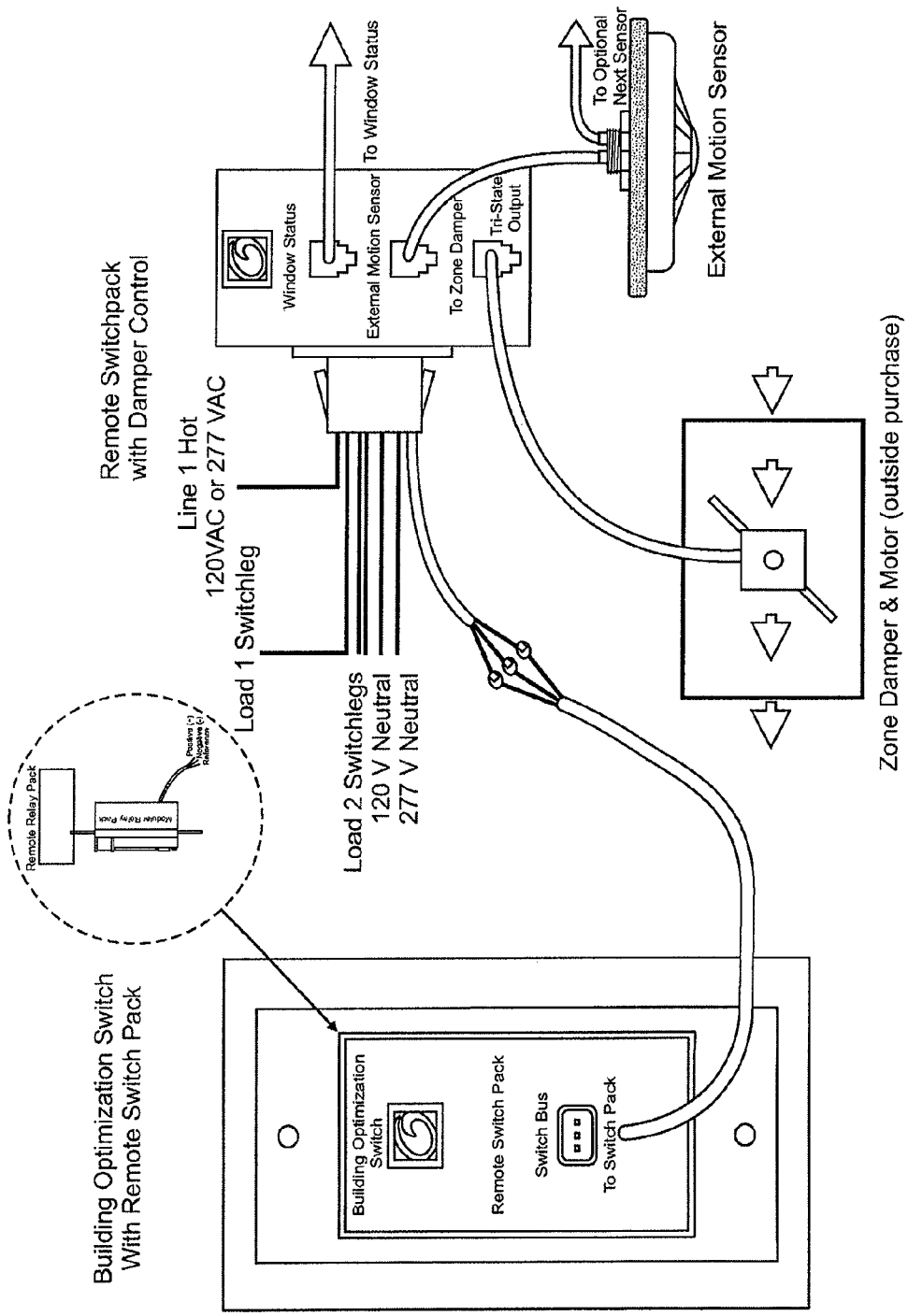
Figure 28:
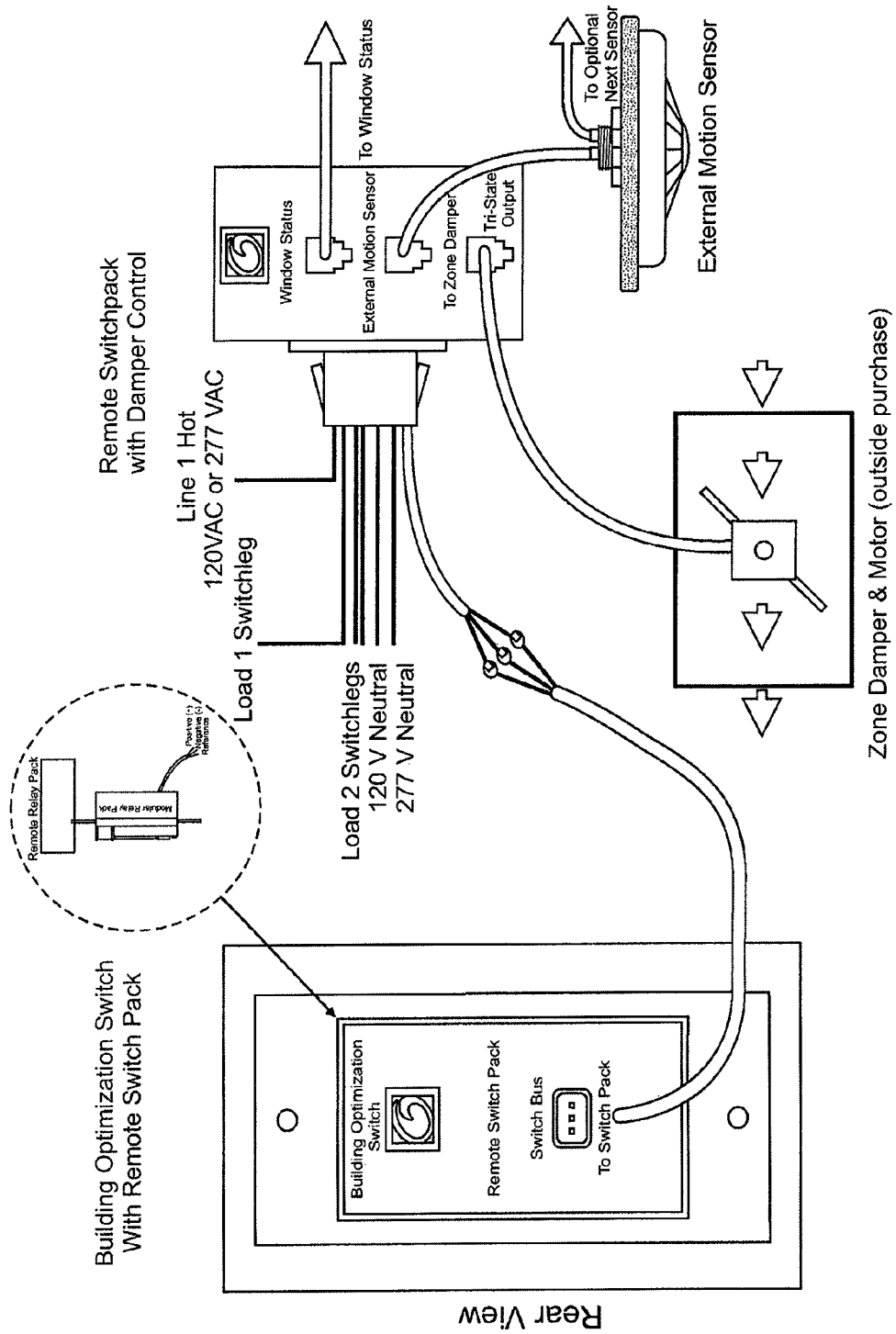
Figure 29:
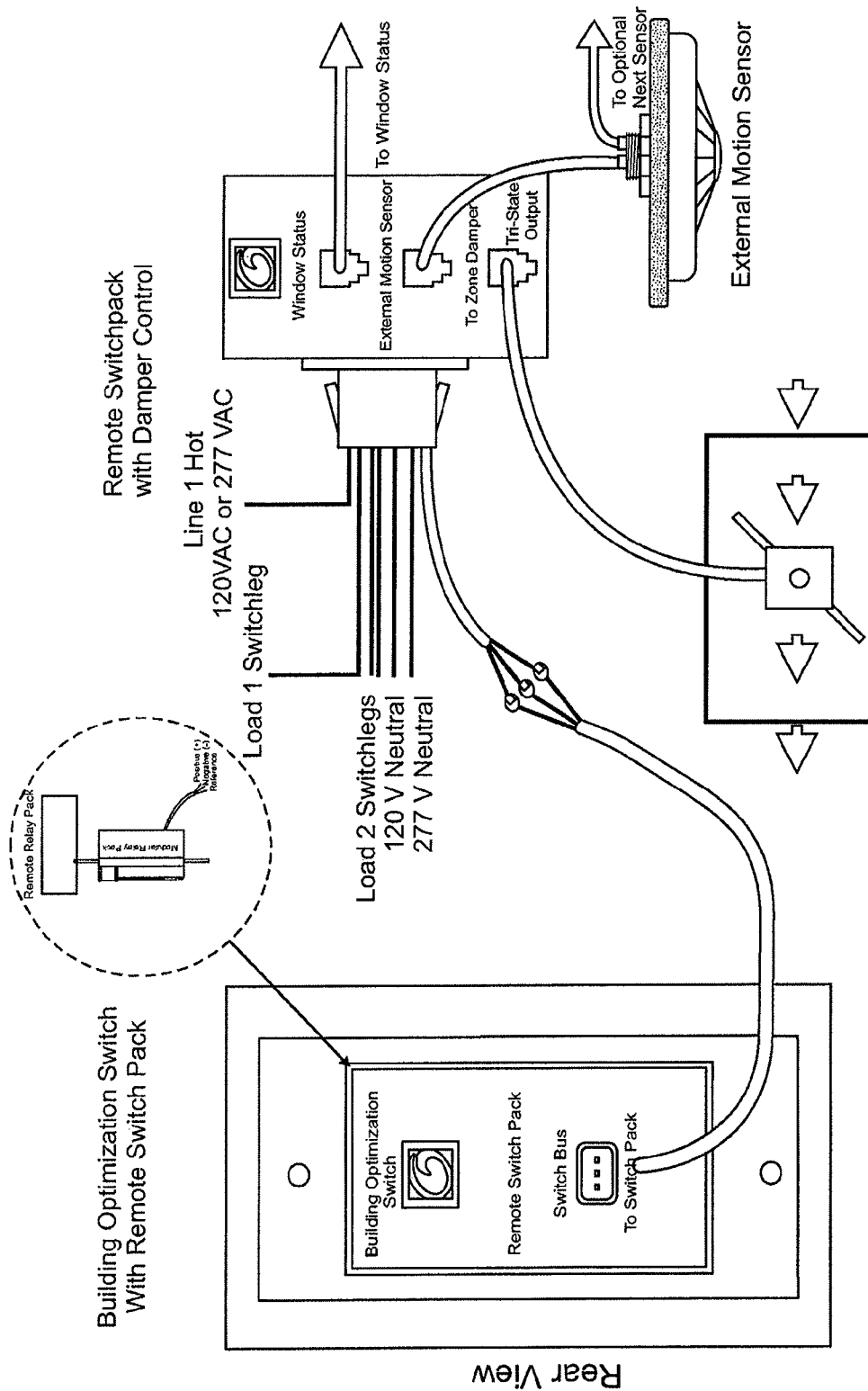

FIG. 26 illustrates the use of a A/B lighting switch with remote switchpack and a second remote switchpack, for connecting and communicating with an external motion sensor. FIG. 27 illustrates the use of a A/B lighting switch with remote switchpack and a second remote switchpack with damper control for connecting and controlling both an external motion sensor and a zone damper and motor. FIG. 28 illustrates a A/B lighting switch with remote switchpack connected with a second remote switchpack with dimmable ballast control for connecting and controlling both an external motion sensor and a dimmable ballast and fixture. FIG. 29 illustrates a A/B lighting switch with remote switchpack connected with a serial switchpack, for connecting and communicating with one or more external motion sensors that are connected in series.

Figure 30:
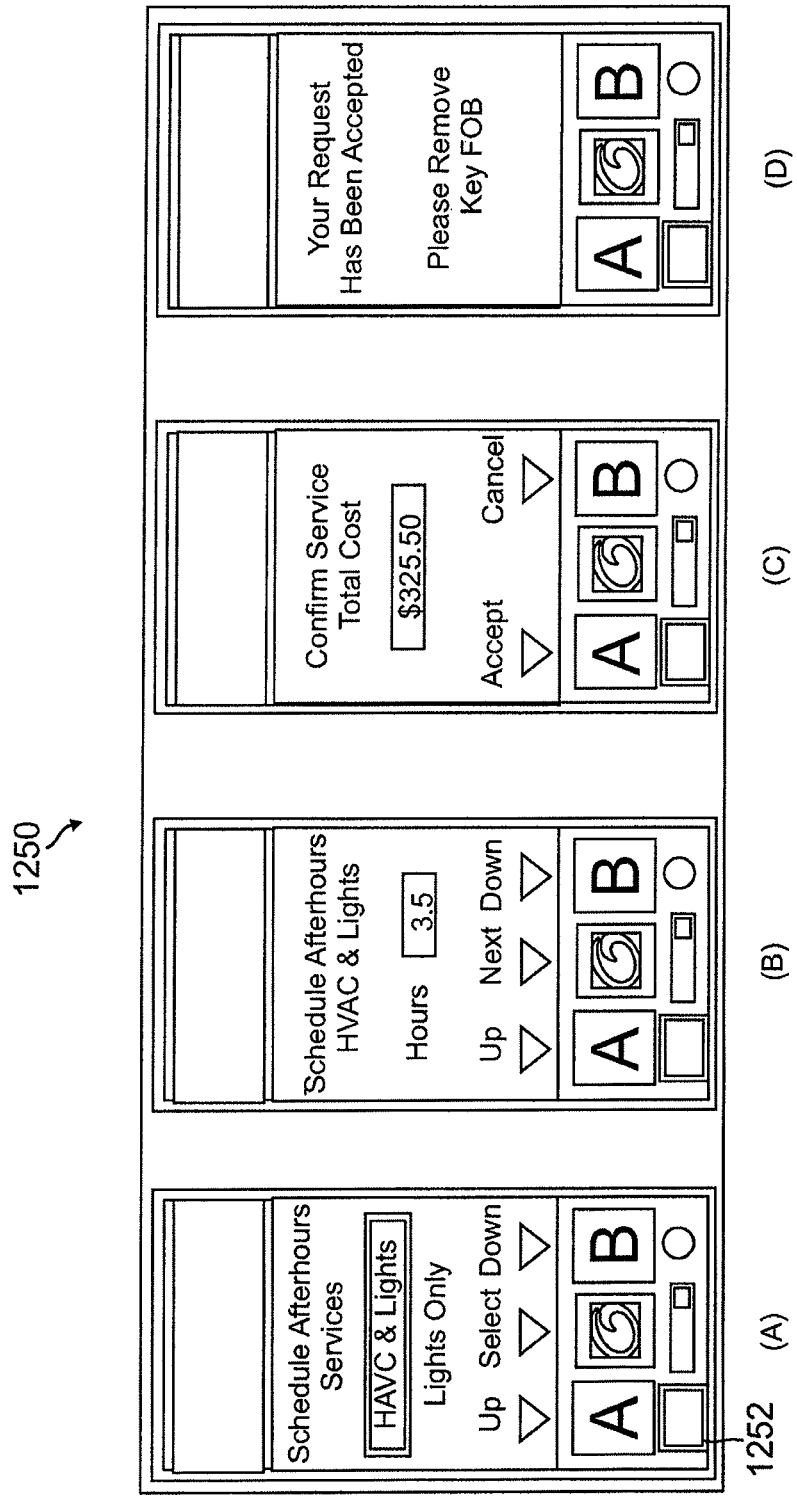
FIG. 30 illustrates an after-hours service mode using a key fob.

With reference to FIG. 3, a system and method for an afterhours service mode is illustrated in FIG. 30. A key fob 1252 is inserted into a service port of the BOS switch 1250. The key fob 1252 can include a port connection interface, such as a male USB connector, firewire connector, or any other data connector. The key fob 1252 can also include memory that can be accessed through the service port. The memory can store data representing an identifier of the user, user permissions to access the afterhours service, and instructions for executing a method for ordering afterhours service via the BOS switch 1250. The key fob 1252 may also include physical switches or input buttons for receiving limited input instructions from a user, but more preferably the key fob 1252 is programmed by a remote computer, and acts as a "dumb" terminal to activate and execute the afterhours service mode.

As shown in FIG. 30A, the key fob 1252 is inserted into the service port, and the BOS switch 1250, recognizing the key fob 1252, provides a display of selectable service types, such as afterhours HVAC and lights, or just lights only. Other service types are possible. Once the user selects a service type, at FIG. 30B the A/B lighting switch 1250 provides a display that lets the user manipulate the keys or buttons to set the requested or required hours for afterhours service. Once the hours are set, at FIG. 30C a total cost for the requested afterhours service is provided on the A/B lighting switch, which can be accepted or canceled by the user. At FIG. 30D, the results of the user's action whether to accept or cancel the service is confirmed on the A/B lighting switch display. During all or part of this method, the BO switch can wirelessly communicate with a master controller or other computer to order the requested afterhours services, create the billing for the user, and generate a record of the method.

Some or all of the functional operations described in this specification can be implemented in digital electronic circuitry, or in computer software, firmware, or hardware, including the structures disclosed in this specification and their structural equivalents, or in combinations of them. Functional aspects of the building optimization system can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Implementations of the building optimization system can include a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

Although a few embodiments have been described in detail above, other modifications are possible. Other embodiments may be within the scope of the following claims.

The invention claimed is:

1. A building optimization system comprising:
   a binary controller to receive user input for communicating one or more control signals to a mechanical device in a zone of a building; and
   an A/B lighting switch connected with the binary controller for controlling at least a first lighting bank and a second lighting bank of a zone, the A/B lighting switch having a motion sensor for detecting occupancy of the zone, logic responsive to input signals from a first lighting control and a second lighting control or the motion sensor for controlling the first lighting bank and the second lighting bank, a service port for receiving one or more instructions from a service key, the one or more instructions placing the A/B lighting switch in a service mode during which the A/B lighting switch is controlled by an external computing source for after hours service, and a graphical display screen adapted to display a graphical user interface to provide information related to a plurality of operation modes, each of the plurality of operation modes being related to the first lighting bank and the second lighting bank and/or an air quality of the zone of the building, the graphical user interface further adapted to display a state of the binary controller.

2. The building optimization system in accordance with claim 1, wherein the binary controller is a window control to control an opening or a closing of one or more windows associated with the zone.

3. The building optimization system in accordance with claim 1, wherein the binary controller is a blinds control to control an opening or a closing of one or more blinds associated with the zone.

4. The building optimization system in accordance with claim 1, wherein the binary controller is adapted for automatic operation under instruction of the A/B lighting switch.

5. The building optimization system in accordance with claim 4, wherein the A/B lighting switch is connected with a temperature sensor.

6. The building optimization system in accordance with claim 5, wherein the automatic operation of the binary controller is based at least in part on a temperature sensed by the temperature sensor.

7. A building optimization system comprising:

a building optimization switch comprising an A/B lighting switch having lighting controls, a service port, and a graphical display, the service port receiving one or more instructions from a service key, the one or more instructions placing the A/B lighting switch in a service mode during which the A/B lighting switch is controlled by an external computing source for after hours service, the A/B lighting switch being further connected to one or more sensors for sensing and measuring environmental data of at least one zone of the building, the graphical display adapted to display a graphical user interface to provide information related to a plurality of operation modes, each of the plurality of operation modes being related to a first lighting bank and a second lighting bank in the at least one zone and/or an air quality of the at least one zone;

a master controller connected with the building optimization switch for tracking energy usage and generating reports based on activities of the building optimization switch, at least a portion of the reports being displayed in the graphical display; and a binary controller connected with the A/B lighting switch to control an environmental variable of the at least one zone based on user input, the environmental data, and/or the energy usage tracked by the master controller.

8. The building optimization system in accordance with claim 7, wherein the binary controller is a window control to control an opening or a closing of one or more windows associated with the at least one zone.

9. The building optimization system in accordance with claim 7, wherein the binary controller is a blinds control to control an opening or a closing of one or more blinds associated with the at least one zone.

10. The building optimization system in accordance with claim 7, wherein the binary controller is adapted for automatic operation under instruction of the A/B lighting switch.

11. The building optimization system in accordance with claim 10, wherein the A/B lighting switch is connected with a temperature sensor.

12. The building optimization system in accordance with claim 11, wherein the automatic operation of the binary controller is based at least in part on a temperature sensed by the temperature sensor.

13. A method comprising:

measuring, by a sensor connected with a building optimization switch having lighting controls and a graphical display, environmental data of at least one zone of the building, the graphical display adapted to display a graphical user interface to provide information related to a plurality of operation modes, each of the plurality of operation modes being related to one or more lighting banks in the at least one zone and/or an air quality of the at least one zone;

receiving, by a service port on the building optimization switch, one or more instructions from a service key, the one or more instructions placing the building optimization switch in a service mode during which the building optimization switch is controlled by an external computing source for after hours service;

controlling, by the building optimization switch, the one or more lighting banks based on the environmental data;

tracking, by a master controller connected with the building optimization switch, energy usage within the at least one zone of the building; and generating, by the master controller, a report based on activities of the building optimization switch, at least a portion of the reports being displayed in the graphical display of the building optimization switch.

* * * * *